United States Patent
Reiley et al.

(10) Patent No.: US 9,965,129 B2
(45) Date of Patent: May 8, 2018

(54) PERSONALIZED CONTENT FROM INDEXED ARCHIVES

(75) Inventors: David Reiley, Berkeley, CA (US); Justin M. Rao, New York, NY (US); Michael Schwarz, Berkeley, CA (US); Andrzei Skrzypacz, Santa Clara, CA (US)

(73) Assignee: EXCALIBUR IP, LLC, New York, NY (US)

( * ) Notice: Subject to any disclaimer, the term of this patent is extended or adjusted under 35 U.S.C. 154(b) by 239 days.

(21) Appl. No.: 13/486,874

(22) Filed: Jun. 1, 2012

(65) Prior Publication Data

US 2013/0326406 A1 Dec. 5, 2013

(51) Int. Cl.
- *G06F 3/048* (2013.01)
- *G06F 17/30* (2006.01)
- *G06F 3/0481* (2013.01)
- *G06F 3/0482* (2013.01)
- *G06F 9/44* (2018.01)

(52) U.S. Cl.
CPC ........ *G06F 3/048* (2013.01); *G06F 17/30699* (2013.01); *G06F 17/30867* (2013.01); *G06F 3/0481* (2013.01); *G06F 3/0482* (2013.01); *G06F 9/4443* (2013.01); *G06F 9/4446* (2013.01)

(58) Field of Classification Search
USPC .......................................... 715/810, 811, 745
See application file for complete search history.

(56) References Cited

U.S. PATENT DOCUMENTS

| | | | |
|---|---|---|---|
| 6,029,194 A | 2/2000 | Tilt | |
| 6,976,028 B2 | 12/2005 | Fenton et al. | |
| 8,245,259 B2 | 8/2012 | McCoskey et al. | |
| 8,725,795 B1 * | 5/2014 | Amacker | 709/203 |
| 2002/0116716 A1 | 8/2002 | Sideman | |
| 2002/0118300 A1 | 8/2002 | Middleton et al. | |
| 2002/0145622 A1 | 10/2002 | Kauffman et al. | |

(Continued)

FOREIGN PATENT DOCUMENTS

| | | |
|---|---|---|
| EP | 0969399 A2 | 1/2000 |
| KR | 20060003257 A | 1/2006 |

(Continued)

OTHER PUBLICATIONS

Silvia Mirri et al., The Director's cut: a solution to collaborative multimedia management, May 15, 2010, Springer Science & Business Media, pp. 319-344.*

(Continued)

*Primary Examiner* — Tam Tran
(74) *Attorney, Agent, or Firm* — James J. DeCarlo; Greenberg Traurig, LLP

(57) ABSTRACT

Personalized content is generated from different media items using a content index. The content index is generated or updated by identifying segments of media items that are of particular interest to users. User interactions with the media items are analyzed and metadata of segments of media items that are determined to be of particular interest to the users is recorded. The parameters associated with a request for personalized content for a user are matched with the recorded metadata to identify relevant media items or segments of media items which are transmitted to the user as the personalized content.

21 Claims, 13 Drawing Sheets

(56) References Cited

U.S. PATENT DOCUMENTS

| | | |
|---|---|---|
| 2003/0028890 A1 | 2/2003 | Swart et al. |
| 2003/0177503 A1 | 9/2003 | Sull et al. |
| 2004/0003397 A1* | 1/2004 | Boston et al. ............. 725/34 |
| 2004/0027369 A1 | 2/2004 | Kellock et al. |
| 2005/0028104 A1 | 2/2005 | Apparao et al. |
| 2006/0010467 A1* | 1/2006 | Segel ........................ 725/34 |
| 2007/0050336 A1 | 3/2007 | Bugir et al. |
| 2007/0050382 A1 | 3/2007 | Bugir et al. |
| 2007/0239787 A1 | 10/2007 | Cunnigham et al. |
| 2007/0239788 A1 | 10/2007 | Cunnigham et al. |
| 2007/0240072 A1 | 10/2007 | Cunnigham et al. |
| 2008/0016245 A1 | 1/2008 | Cunningham et al. |
| 2008/0066111 A1 | 3/2008 | Ellis et al. |
| 2008/0102911 A1 | 5/2008 | Campbell et al. |
| 2008/0112690 A1* | 5/2008 | Shahraray et al. .......... 386/124 |
| 2008/0126303 A1* | 5/2008 | Park .................. G06F 17/30828 |
| 2008/0313227 A1 | 12/2008 | Shafton et al. |
| 2009/0006375 A1 | 1/2009 | Lax et al. |
| 2010/0094866 A1* | 4/2010 | Cuttner et al. ................ 707/723 |
| 2010/0228724 A1* | 9/2010 | Petri et al. .................... 707/722 |
| 2011/0099195 A1* | 4/2011 | Patwardhan et al. ........ 707/769 |
| 2011/0207482 A1 | 8/2011 | Shamma et al. |
| 2011/0208822 A1 | 8/2011 | Rathod |
| 2011/0307924 A1* | 12/2011 | Roberts et al. ................ 725/44 |
| 2012/0089945 A1* | 4/2012 | Bellamy et al. ............. 715/817 |
| 2013/0160051 A1* | 6/2013 | Armstrong .......... H04N 21/454 725/34 |
| 2013/0173526 A1* | 7/2013 | Wong et al. .................... 706/54 |
| 2013/0227596 A1* | 8/2013 | Pettis ................ H04N 21/2353 725/13 |

FOREIGN PATENT DOCUMENTS

| | | |
|---|---|---|
| WO | 2007/120694 A1 | 10/2007 |
| WO | 2007/120696 A2 | 10/2007 |
| WO | 2007120691 A1 | 10/2007 |
| WO | 2008/054505 A2 | 5/2008 |

OTHER PUBLICATIONS

Gunther Holbling et al., PersonalTV a TV recommendation system using program metadata for content filtering, Sep. 15, 2009, Springer Science & Business Media, pp. 259-288.*

Yijuan Lu et al., Personalization in multimedia retrieval: A survey, Nov. 3, 2010, Springer Science & Business Media, pp. 247-277.*

U.S. Appl. No. 13/178,396, filed Jul. 7, 2011.

Chakrabarti et al., "Event Summarization using Tweets", © 2011, Association for the Advancement of Artificial Intelligence (11 pgs).

Shamma et al., "Tweet the Debates—Understanding Community Annotation of Uncollected Sources", WSM'09, Oct. 23, 2009, Beijing China, Copyright 2009 ACM (8 pgs).

Shamma et al., "Conversational Shadows: Describing Live Media Events Using Short Messages", Proceedings of the Fourth International AAAI Conference on Weblogs and Social Media, © 2010, Association for the Advancement of Artificial Intelligence, pp. 331-334.

Shamma et al., "Peaks and Persistence: Modeling the Shape of Microblog Conversations" CSCW 2011, Mar. 19-23, 2011, Hangzhou, China, Copyright 2011 ACM (4 pgs).

* cited by examiner

| 802 TIME | 804 CURRENT SCORE | 806 TEAM IN POSSESSION | 808 RESULT OF POSSESSION | 810 RESULT FOLLOWING POSSESSION | 812 PLAYERS ON FLOOR | 814 PLAYERS INVOLVED IN OUTCOME | 816 SPECIAL EVENTS |
|---|---|---|---|---|---|---|---|

| 854 CURRENT SCORE | 856 AT-BAT IDENTIFIER | 858 RANKING | 860 BAD CALL IDENTIFIER | 862 RESULT OF THE AT-BAT | 864 GAME CHANGING ID | 866 SPECIAL EVENTS |
|---|---|---|---|---|---|---|

PERSONALIZED CONTENT FROM INDEXED ARCHIVES

The present disclosure relates to generating personalized content from different media items.

BACKGROUND

Developments in science and technology have lead to emergence of various media for content delivery which include text, audio and video media. Each of these media progressively consumes greater resources with the video data taking up the most resources in terms of storage and delivery. Increasing bandwidths and processing powers are enabling people to access and consume content such as videos not only from traditional devices such as, televisions but also from their computers, laptops and mobile phones. However, the sheer volume of content that is generally available and the busy lifestyles of modern consumers permits them little time to view all the content that they have access to.

SUMMARY

This disclosure provides for generating personalized content from different media items using systems and methodologies that create and update a content index that indexes media items or parts thereof based on different criteria.

A method for indexing content is disclosed in accordance with one embodiment. The method begins with a computing device receiving interaction data of a plurality of users interacting with a first media item in different ways. From the received interaction data, the computing device identifies different actions executed by the users and a respective number of users executing each of the actions. The respective number of users for each action is compared with a predetermined threshold and at least one action whose respective number of users exceeds the threshold is selected as a significant user interaction. A predefined set of user interactions indicative of high user interest in media items is received by the computing device and an extent of user interest in the first media item is determined based on a comparison of the significant user interaction with the predefined set of user interactions. The computing device further updates metadata in a content index based on the determined extent of user interest.

In an embodiment, if it is determined that the first media item was interesting to the users, the computing device further determines if the first media item is a segment extracted from a second media item. If it is determined that the first media item is not a segment extracted from the second media item, the computing device extracts the segment associated with the significant user interaction. Initially, the starting and ending time offsets associated with the significant user interaction are obtained and a segment between the starting and ending time offsets of the first media item is extracted and stored in an archive on a data storage medium by the computing device. In addition, metadata associated with the extracted segment is obtained and a new entry is generated in the content index for storing the metadata of the extracted segment. A value of a level of interest variable for the extracted segment is also determined by the computing device based on a number of the plurality of users associated with the significant user interaction. If it is determined that the first media item is a segment extracted from the second media item, the computing device updates metadata in a pre-existing entry in the content index associated with the first media item based on the received interaction data.

In one embodiment, the computing device receives the second media item for extraction of segments. A domain-specific criterion associated with the second media item is identified for the extraction and segments including the first media item are extracted from the second media item based on the domain-specific criterion. If the first media item is a segment of the second media item and the metadata associated with the first media item can comprise a unique identifier for the first media item, temporal metadata related to the first media item, entities associated with the first media item, a total time period of the first media item, a level of interest variable of the first media item, emotional metadata associated with the first media item, an identity of the second media item, a starting and ending time offsets of the first media item within the second media item, an importance score of the first media item. In an embodiment, the metadata of the first media item can depend on the domain associated with the first media item. If, for example, the first media item relates to a sporting event and the metadata further comprises an identity of sport being played, an identity of the sporting event, and additional metadata generated based on the sport being played. If, for example, the first media item relates to a news event and the metadata comprises a type of news event, an identification of the news event, entities featured in the extracted segment, and additional metadata based on the news event. If it is determined by the computing device that the level of user interest in the first media item is low, the first media item is deleted from the archives comprising the media items.

A computing device comprising a processor, a storage medium for tangibly storing thereon program logic for execution by the processor are disclosed in accordance with one embodiment. The logic executed by the processor comprises receiving logic, for receiving interaction data of a plurality of users interacting with a first media item, identifying logic, for identifying a significant user interaction in the interaction data of the plurality of users, obtaining logic, for obtaining a predefined set of user interactions indicative of high user interest in media items, determining logic, for determining an extent of user interest in the first media item based on a comparison of the significant user interaction with the predefined set of user interactions and updating logic, for updating metadata in a content index based on the determined extent of user interest. In an embodiment, the identifying logic which identifies the significant user interaction further comprises user interactions identifying logic, for identifying various user interactions in the received interaction data, comparing logic, for comparing a respective number of users executing each of the user interactions with a predetermined threshold and selecting logic, for selection of at least one of the user interactions whose respective number of users exceeds the threshold as the significant user interaction.

In an embodiment, if it is determined that the first media item was interesting to the users, the processor also executes segment determining logic, for determining if the first media item is a segment extracted from a second media item. If it is determined that the first media item is not a segment extracted from the second media item, the processor executes time offset obtaining logic, for obtaining starting and ending time offsets associated with the significant user interaction, extracting logic, for extracting a segment between the starting and ending time offsets of the first media item and segment storing logic, for storing the extracted segment in an archive. Additionally, the processor also executes segment metadata obtaining logic for obtaining metadata of the extracted segment, entry generating logic, for generating a new entry in the content index corresponding to the extracted segment and metadata storing logic for storing the metadata obtained for the extracted segment in the new entry. A level of interest determining logic is executed by the processor, for determining value of a level of interest variable for the extracted segment based on a respective number of the plurality of users associated with the significant user interaction. Metadata updating logic, executed by the processor, updates metadata in a pre-existing entry in the content index associated with the first media item if it is determined that the first media item is a segment extracted from the second media item.

In an embodiment, media item receiving logic, executed by the processor, receives the second media item for extraction of segments wherein criterion identifying logic also executed by the processor, identifies a domain-specific criterion associated with the second media item for the extraction. The processor also executes extracting logic, for extracting the segments comprising at least the first media item from the second media item based on the domain-specific criterion.

A computer readable storage medium, having stored thereon, instructions executable by a processor is disclosed in accordance with one embodiment. The instructions cause the processor to receive interaction data of a plurality of users interacting with a first media item, identify a significant user interaction in the interaction data of the plurality of users, obtain a predefined set of user interactions indicative of high user interest in media items, determine an extent of user interest in the first media item based on a comparison of the significant user interaction with the predefined set of user interactions and update metadata in a content index based on the determined extent of user interest. In addition, the processor also determines whether the first media item is a segment extracted from a second media item if it is determined that the first media item was interesting to the users. If it is determined that the first media item is not a segment extracted from the second media item, the instructions further cause the processor to obtain starting and ending time offsets associated with the significant user interaction, extract a segment between the starting and ending time offsets of the first media item, store the extracted segment in an archive and obtain metadata of the extracted segment. The processor then executes instructions to generate a new entry in the content index corresponding to the extracted segment and store the metadata obtained for the extracted segment in the new entry. In an embodiment, the instructions further cause the processor to update metadata in a pre-existing entry in the content index associated with the first media item if it is determined that the first media item is a segment extracted from the second media item. In an embodiment, the processor also executes instructions to receive the second media item for extraction of segments, identify a domain-specific criterion associated with the second media item for the extraction, and extract the segments comprising at least the first media item from the second media item based on the domain-specific criterion.

A method of providing personalized content is disclosed in accordance with one embodiment. The method begins with receiving, by a computing device, a request for personalized content. Upon receiving the request, the computing device obtains parameters associated with the request and accesses a content index comprising metadata associated with media items. A plurality of the media items with metadata that match at least a subset of the parameters are identified by the computing device, wherein the plurality of media items are segments extracted from disparate ones of the media items. In an embodiment, the plurality of media items are selected from a group consisting of audio items and video items. Respective values of a level of interest variable for each of the plurality of media items are retrieved. The values are indicative of a likely extent of user interest in each of the plurality of media items. At least a subset of the plurality of media items are selected by the computing device for inclusion into the personalized content, based on the respective values of the level of interest variable. In an embodiment, the parameters obtained from the user request, further comprise a number of media items to be included in the personalized content, a time period of each of the subset of media items, and a total time period of the personalized content. In an embodiment, the computing device selects for inclusion into the personalized content, the subset of the plurality of media items that comprise the respective values that are indicative of a high level of user interest and transmits the personalized content comprising the selected ones of the plurality of media items to the user. In an embodiment, the computing device further detects user actions executed as a user consumes the personalized content and updates the respective values for the level of interest variable based on the detected user actions.

In an embodiment, the computing device can obtain a criterion for arranging the subset of media items in the personalized content to be transmitted to the user. The criteria for arranging the subset of media items can comprise temporal data specifying a temporal sequence for ordering the subset of media items, a user ordered list of entities or combinations thereof. Accordingly, the computing device arranges the subset of media items based on the identified criterion. In an embodiment, the subset of media items are selected as the personalized content to be transmitted to the user based on respective importance scores. The respective importance scores are indicative of importance of content in each of the subset of media items to proceedings featured in respective media items from which the subset of media items are extracted.

A computing device comprising a processor and a storage medium for tangibly storing thereon program logic for execution by the processor is disclosed in accordance with an embodiment. The processor executes logic for receiving a request for personalized content, obtaining parameters associated with the request, accessing a content index comprising metadata associated with media items and identifying a plurality of the media items with metadata that match at least a subset of the parameters. In an embodiment, the plurality of media items are segments extracted from disparate ones of the media items. The processor further executes logic for obtaining respective values of a level of interest variable for each of the plurality of media items, wherein the values are indicative of a likely extent of user interest in each of the plurality of media items. Selecting logic, is executed by the processor, for selecting at least a subset of the plurality of media items for inclusion into the personalized content, based on the respective values which personalized content comprising the subset of media items is transmitted to the user by the transmitting logic executed by the processor. In an embodiment, the processor executes logic for selecting the subset of the plurality of media items comprising the respective values that are indicative of a high level of user interest. The processor also executes user interaction receiving logic, for receiving information regarding user actions executed as a user consumes the personalized content and updating logic is executed by the processor, for updating the respective values for the level of interest variable for the subset of media items based on the detected user actions. In an embodiment, criteria identifying logic is executed by the processor, for identifying a criterion for arranging the subset of media items in the personalized content to be transmitted to the user. Based on the identified criterion, arranging logic is executed by the processor, for arranging the subset of media items in the personalized content transmitted to the user. The criterion for arranging the subset of media items can comprise temporal data specifying a temporal sequence for ordering the plurality of media items or a ordered list of entities selected and/or ordered by the user. In an embodiment, the selecting logic further comprises, importance score selecting logic, executed by the processor, for selecting the subset of media items as the personalized content based on respective importance scores, the respective importance scores are indicative of importance of content in each of the subset of media items to proceedings featured in respective media items from which the subset of media items are extracted.

A computer readable storage medium, having stored thereon, instructions for execution by a processor, are disclosed in accordance with an embodiment. The instructions cause the processor to receive a request for personalized content, obtain parameters associated with the request, access a content index comprising metadata associated with media items and identify a plurality of the media items with metadata that match at least a subset of the parameters. In an embodiment, the plurality of media items are segments extracted from disparate ones of the media items. The processor further obtains respective values of a level of interest variable for each of the plurality of media items, wherein the values are indicative of a likely extent of user interest in each of the plurality of media items, selects at least a subset of the plurality of media items for inclusion into the personalized content, based on the respective values and transmits the personalized content comprising the subset of media items to the user. In an embodiment, the instructions cause the processor to select for inclusion into the personalized content, the subset of the plurality of media items that comprise the respective values that are indicative of a high level of user interest. In an embodiment, the instructions further cause the processor to receive information associated with user actions executed as a user consumes the personalized content and update the respective values for the level of interest variable based on the detected user actions. In an embodiment, the processor selects the subset of media items as the personalized content transmitted to the user based on respective importance scores, the respective importance scores are indicative of importance of content in each of the subset of media items to proceedings featured in respective media items from which the subset of media items are extracted.

A method for providing personalized content is disclosed in accordance with one embodiment. The method begins with displaying, by a computing device on a display medium, a personalized user interface comprising information associated with a plurality of entities previously selected by a user. A current user selection of one of the plurality of entities is received and transmitted by the computing device to a personalized content provider. Personalized content associated with the current user selection, is received by the computing device which personalized content comprises a plurality of media segments extracted from media items featuring the user selected entity, wherein each of the plurality of media segments has a respective value of a level of interest variable indicative of high user interest. The received personalized content is displayed to the user by the computing device. The computing device further receives and transmits to the content provider, information regarding a user interaction with the personalized content during the display of the personalized content.

A computing device comprising a processor and a storage medium for tangibly storing thereon program logic for execution by the processor is disclosed in accordance with an embodiment. The program logic comprises, interface display logic, for displaying, a personalized user interface associated with a content provider and comprising regarding a plurality of entities previously selected by a user on a display medium. Current selection receiving logic, is executed by a processor, for receiving a current user selection of one of the plurality of entities. Current selection transmitting logic, is executed by a processor, for transmitting the current user selection to the content provider. Receiving logic, is executed by a processor, for receiving from the content provider, personalized content associated with the current user selection and personalized content display logic, is executed by a processor, for displaying the received personalized content to the user. In an embodiment, programming logic is further executed by a processor, for receiving and transmitting to the content provider, information regarding a user interaction with the personalized content during the display of the personalized content.

These and other embodiments and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views:

FIG. 8*a* is a schematic diagram illustrating a data structure comprising domain-specific metadata associated with basketball games in accordance with an embodiment of the present disclosure;

FIG. 8*b* is a schematic diagram illustrating a data structure comprising domain-specific metadata associated with baseball games in accordance with one embodiment;

DESCRIPTION OF EMBODIMENTS

Figure 1:
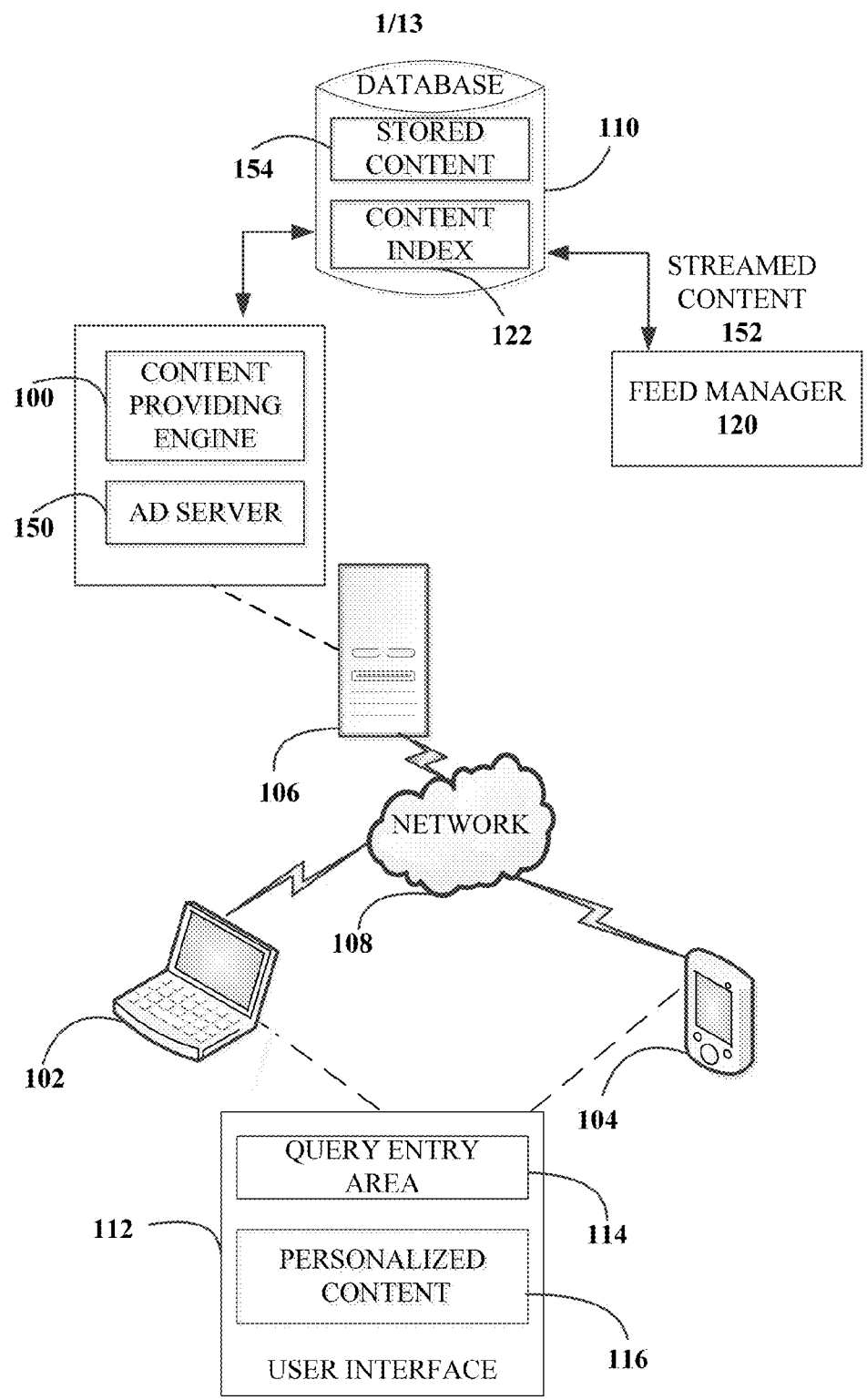
FIG. 1 is a block diagram of an embodiment wherein a computing device or client device communicates with a server computer in accordance with an embodiment of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The Information Age has made available different types of content to the users via various modalities. Digital devices delivering text, audio and video data are used around the world to transfer information almost instantaneously. This can include publicly available content such as, live broadcasts of events, movies or television shows or personal content such as, emails, audio and video messages exchanged between different users. However, among the various forms of digital content, video content is one of the most resource intensive type of data to be transmitted over the networks. Moreover, as modern consumers have limited time to view or consume all the content they receive, providing highlights of various content items can save resources for the providers while enabling consumers to balance their information needs with the time at their disposal. Generating highlights of various content items such as the musical/sport/news events or television shows provides a convenient way to deliver a sizable amount of information distilled into smaller time periods while optimizing the resources. Generally, highlights of a particular event are produced based on parts of the event that are most exciting to the majority of the viewers or audience. However, different users can have different preferences with regards to a particular content item. For example, different users may prefer highlights oriented towards different players or different teams involved in a particular sporting event. Therefore, producing personalized content, such as highlights of media items including but not limited to a video or an audio content item customized to a user's preferences, adds value to the content for users while leading to greater usage among the users for the content provider.

Turning now to the figures, FIG. 1 is a block diagram of an embodiment wherein a computing device or client device 102/104 communicates with a server computer 106 executing a content providing engine 100, over a network 108 such as the Internet. The client devices 102/104 are employed by users to display a user interface 112 associated with the content providing engine 100 such as an audio/video player displayed via a web browser or a stand alone player application or a mobile application, referred to herein as "app". In one embodiment, the user interface 112 includes a query entry area 114 where a user can enter a query or request for content. The requested content/media item 116 is retrieved and transmitted by the content providing engine 100 based for example, on the user privileges or other criteria. In an embodiment, the content/media item 116 can be generated automatically as will be detailed further infra. In an embodiment the content 116 requested by the user can be personalized to the user's preferences. Such personalized content can comprise, for example, segments from an audio or video media items featuring highlights selected per the user's preferences. The content providing engine 100 accesses relevant media items either from archives in the database 110 which are further personalized as will be described further infra prior to being transmitted to the user. Thus, highlights from an audio recording of a musical event or a play or a speech, or a video recording of a news/sports/television/Internet broadcast event or even a movie can be generated by the content providing engine 100.

In an embodiment, the personalized content 116 can be automatically provided without explicit user request on the user's home page based on the entities associated with the user's interests. Various methodologies as detailed herein such as explicitly requesting user input or implicit input collected by monitoring user behavior can be used to identify entities, such as but not limited to, personalities, locations, issues or institutions of interest to the user. The personalized content 116 thus provided can be updated as new content associated with such entities becomes available to the content providing engine 100. In an embodiment, the personalized content 116 is generated based on various attributes and domain-specific parameters. The attributes of such personalized highlights can include but are not limited to, the total length of the personalized content to be generated, length of each segment in the personalized content or number of media segments in the highlights. These attributes can be explicitly derived from user preferences or they can be implicitly obtained by monitoring user behavior and which attributes may vary from user to user or, for the same user, they may vary from one request to another. In addition, the personalized content 116 is generated based on metadata associated with each of the media items from which the personalized content 116 or personalized highlights are generated. Thus, by the way of illustration and not limitation, there can be some metadata, such as length of a particular clip/fragment/segment, a unique database id, a "level of interest" variable indicating the extent of user interest in the segment, which can be commonly defined for each media segment regardless of the type of content associated therewith. In an embodiment, domain-specific metadata can be additionally defined for a media segment based on the type of content or a particular event type being associated with the media item from which the media segment is obtained. Thus, media segments obtained by partitioning different media items from the same domain can have similar domain-specific metadata associated therewith. For example, two video clips obtained from videos of two different football games can have similar metadata associated therewith.

In an embodiment, the implicit or explicitly received user input or parameters associated with the user profile/account are analyzed to obtain the attributes and the metadata required to generate the personalized content 116. For example, if the user desires to watch personalized video highlights of a sporting event, the content providing engine 100 can generate such personalized video highlights based on parameters in the user request which are mapped to the domain-specific metadata defined in the content providing engine 100 for the particular sport. In the case of the sporting event, the domain-specific metadata can comprise but is not limited to, the type of sport being played, the teams, the players involved in the sporting event(s), the type of play the user is interested in or other parameters associated with the event by the virtue of the event belonging to a particular type of sport in the sports domain.

In an embodiment, the parameters can be preset within a user account and may be retrieved therefrom. The user account can be a Fantasy Sports account, for example, associated with Fantasy Football, and the metadata for generating personalized video highlights of a football match can be obtained from the user parameters/preferences set within the user's Fantasy Football account. Thus, when the user queries for highlights of a football match, the players on the user's roster within the Fantasy Football account can be automatically accepted as implicit input parameters for generating the personalized content 116. Accordingly, highlights which feature such players can be dynamically generated. In an embodiment, the user can provide particular temporal parameters for generating personalized content. For example, the user can query for a video comprising of all the key plays made within the past week by players on the user's roster. In an embodiment, the personalized content 116 can include images of players in the user's Fantasy Football team, and by clicking on a player, the user can see highlights or a list of plays of the player in a time frame specified by the user or a default time frame preset within the content providing engine 100. In an embodiment, a highlight reel of the user's team showing fragments or segments associated with the players on the user's Fantasy sports roster ranked by their fantasy point contribution, recency and popularity among the users at large can be automatically provided to the user on the main page. A user seeing the list of scores of his favorite players can choose to watch them or upvote his favorite ones. In an embodiment, the highlights can be ranked by the point contribution of the player. In an embodiment, the highlights can be ranked by their respective popularity among all the viewers.

In an embodiment, the user can request personalized highlights related to a news item or a television network broadcast item. For example, the user can query for a one hour personalized video and/or audio highlights of the State of Union addresses given by the current U.S. president in the past three years. Similarly, the user can query for a thirty minute personalized video comprising highlights of all the episodes of a particular television series broadcast over the last fortnight featuring the user's preferred actor/character. Again, in both the aforementioned situations, the personalized content 116 is generated based on a combination of general attributes and domain-specific metadata which is recognized from the parameters obtained in the user requests. The general attributes as discussed supra can include but are not limited to, the total length of the personalized content to be generated, length of each segment in the personalized content or number of media segments in the highlights. The domain-specific metadata used for generating highlights of the State of Union addresses in one embodiment can include but are not limited to, identity associated with the news event, time/date of occurrence of the event, entities, such as personalities, locations or organizations associated with the news event. The domain-specific metadata used for generating highlights of the television series can include but are not limited to, the identity or title of the show, the date/occurrence of the episodes, the actors or characters featured in the episodes, the time period (e.g., starting and ending times) of each scene in an episode.

The generation of the personalized content 116 is facilitated by a content index 122 built from the different content supplied to the server 106. In an embodiment, the content index 122 can be database that comprises database tables associated with various content items. In an embodiment, the content index 122 can comprise tables that index information related to audio content items which comprises metadata of segments and optionally the segments within audio content items that are likely to be of particular interest to users. In an embodiment, the content index 122 can comprise tables that index information related to video items and which comprise metadata of segments within video content items that are likely to be of particular interest to users. In an embodiment, the content index 122 can comprise a plurality of domain-specific database tables which index metadata of content items from respective domains. Thus, by the way of illustration and not limitation, the content index 122 can comprise a database table including metadata associated with the video segments obtained from the various football games. In an embodiment, the content index 122 can also comprise the video segments in addition to their respective metadata. Similarly, the content index 122 can comprise a disparate database table including metadata of video segments featuring various natural disasters that occurred around the world.

In an embodiment, the content index 122 is generated from a content item by partitioning or dividing the content item into various segments or clips based on the characteristics of its respective domain. In an embodiment, the content index 122 can be created by observing user behavior as the users view or otherwise interact with the content and flagging parts of the media items that are determined to be of particular interest to the users. In an embodiment, data feed from social networking services, such as TWITTER or data from the search logs comprising search histories of users can be used to identify particular interesting segments of a media item in accordance with embodiments as described further infra. When personalized audio/video highlights are to be generated, the content providing engine 100 accesses the content index 122, identifies segments from one or more media items, which segments have metadata matching the user's parameters and dynamically assembles the segments of the media item(s) in a manner that is implicitly or explicitly requested by the user and the resulting personalized content 116 is transmitted to the user. Therefore, in accordance with an embodiment, the content providing engine 100 is configured to provide personalized content generated on the fly.

In an embodiment, the content index 122 can be generated from content/media items 152 streamed from a network entity, such as, the feed manager 120 or from content/media items which can be comprised within the stored content 154 of the database 110 and accessible to the content providing engine 100. It may be appreciated that the content index 122 and the stored content 154 are shown as being comprised within the database 110 only by the way of illustration and not limitation and that each of the content index and the stored content 154 can comprise a plurality of modules which may be distributed over different databases coupled via communication networks such as network 108. In an embodiment, the content index 122, can be generated from a text file comprising a list of events. By the way of illustration and not limitation in the case of a sporting event such as a basketball game or a football game the content index 122 comprising metadata for the segments from a video recording of the game can be generated from the game log that indexes events based on the game clock. For example, for a football game, the game log can include a textual description of the game, such as, "At 3:02:43, at $3^{rd}$ down with 7 yards to go on his own 32-yard-line, Roethlisburger took the snap and handed off to Hamilton, who ran yards for a first down before being tackled by Lambert and Johnson. The play ended at 3:02:51." The metadata associated with the media item corresponding to the list of events can comprise the start and end times, the line of scrimmage, the down, the yards to go, the players involved, their actions and the outcome of the play. In another example, the content index for a basketball game can be generated from the scoring logs which record the assists made and shots taken by each player, each possession and each defensive situation. The content index 122 thus generated is employed by the content providing engine 100 in producing personalized media programs as described in accordance with embodiments detailed herein.

In an embodiment, an advertisement server 150 can serve context sensitive advertisements to be displayed on web pages or mobile applications associated with the content providing engine 100. Although the advertisement server 150 is shown in this embodiment as located on the same server computer 106 as the content providing engine 100, it can be appreciated that this is not necessary. The advertisement server 150 can also be located with the feed manager 120 or it can also be located independently on an external machine that is disparate from both the server computer 106 and the feed manager 120. In an embodiment, an "ad server" can comprise a server that stores online advertisements for presentation to users. "Ad serving" refers to methods used to place online advertisements on websites, in applications, or other places where users are more likely to see them, such as during an online session or during computing platform use, for example. Advertising may be beneficial to users, advertisers or web portals if displayed advertisements are relevant to interests of one or more users. In an embodiment, advertisements can be presented to users in a targeted audience based at least in part upon predicted user behavior(s) or user profile information.

Figure 2:
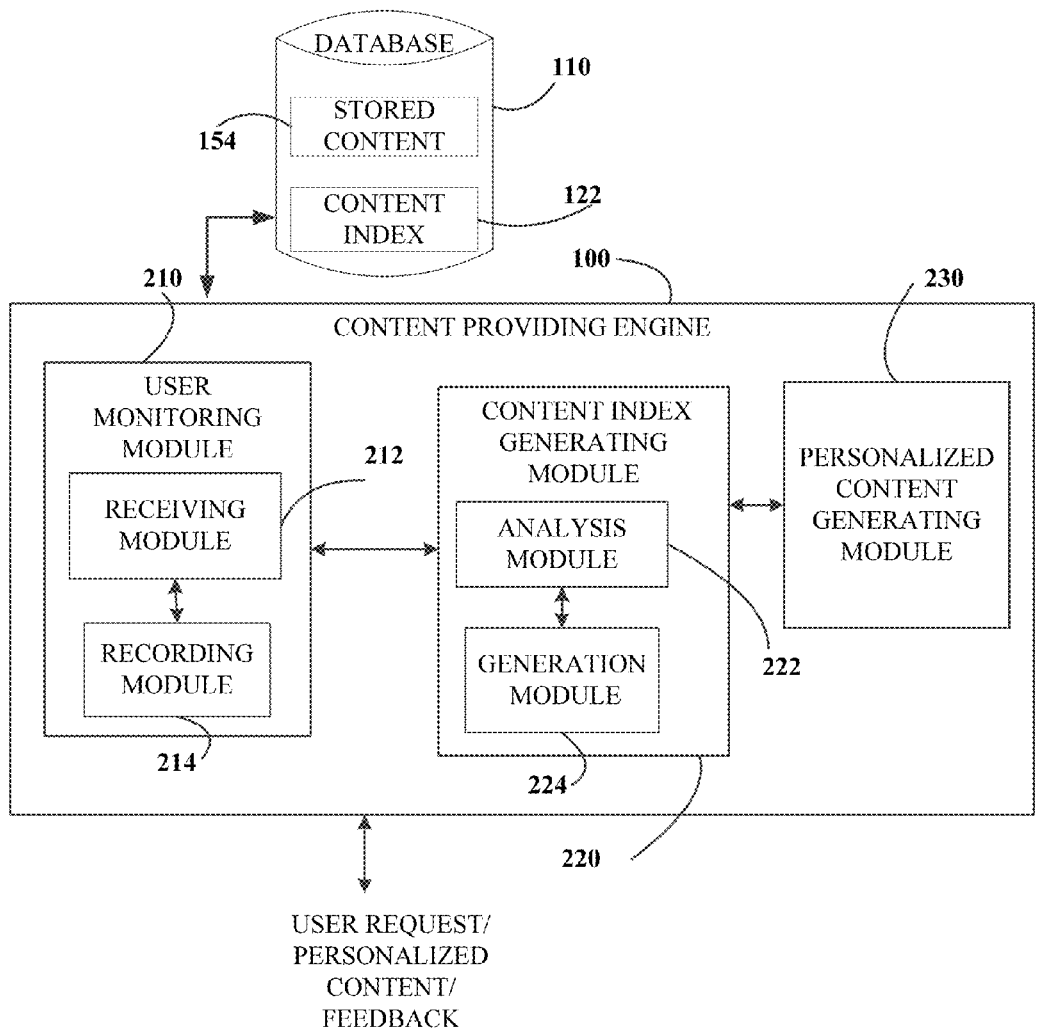
FIG. 2 is a block diagram depicting certain modules within the content providing engine in accordance with an embodiment of the present disclosure.

FIG. 2 is a block diagram depicting certain modules within the content providing engine 100 in accordance with an embodiment. The content providing engine 100 comprises of a user monitoring module 210, a content index generating module 220 and a personalized content generating module 230. As discussed supra, when a user requests personalized content, the content providing engine 100 accesses a content index 122 in order to generate content such as, audio/video media items personalized to the user's requirements.

In an embodiment, the content index 122 can be built from interesting segments identified from media items by monitoring user behavior. The content providing engine 100 can comprise a user monitoring module 210 that monitors and records user input or behavior of users as they interact with particular media items, for example, as they listen to, view or tag media items. The user behavior thus recorded is analyzed to determine significant trends which can then be employed to identify particular segments of media items which will likely be of interest to other users. In one embodiment, the user monitoring module 210 can comprise a receiving module 212 that receives as input various user actions such as but not limited to, fast forwarding, rewinding, pausing, repeatedly playing particular segments within an audio/video media item, playing a segment of a video at specific predetermined speeds, exchanging communication regarding a particular incident or segment of a media item with social contacts or searching for a particular media item or segment within the media item. In an embodiment, the user input obtained by the receiving module 212 can additionally include feedback from the users regarding personalized content provided to them by the content providing engine 100. Thus, if the users up-vote/like or tag or forward to contacts particular segments in personalized highlights, they may have received from the content providing engine 100, such data is also obtained by the receiving module 212.

The user input data thus obtained by the receiving module 212 can be aggregated from a large group of users who executed the various actions and analyzed to determine significant trends. The user input data can be an initial user reaction to media item or it can be feedback to content personalized by the content providing engine 100 based on their respective preferences. For example, when users are looking at the video of a prior day's baseball game from a provider, such as, YAHOO! Connected TV, the user monitoring module 210 can identify from the recorded data that 2253 different users all fast-forwarded through the game until they got to the spectacular upper-deck home run in the bottom of the third inning. The users saw the ball going farther than they had ever seen, stopped the fast forward, scrolled backwards to the moment of the pitch and then watched at a regular speed for twenty nine seconds on average, before fast-forwarding again. The user monitoring module 210 can further comprise a recording module 214 that records such user behavior patterns and flags the particular segment of the game video for further processing. For example, the user monitoring module 210 can be configured to identify specific actions and record the location of the corresponding segment within the media item, for example in terms of temporal data, when the number of users that execute the specific actions exceeds a particular threshold. In one embodiment, the user behavior thresholds for different media items can be preset based on previously obtained viewership data for the particular content type. In an embodiment, a particular segment identified by the user monitoring module 210 can be brought to the attention of a human editor who can then tag the event with appropriate metadata and further promote it among various distribution channels. In an embodiment, the user behavior data of a particular media item as obtained by the user monitoring module 210 can be communicated to the content index generating module 220 which can further process such data for generating and/or updating the content index 122.

As described supra, the content index 122 is generated by analyzing the media items or information associated therewith which are accessible to the content providing engine 100 via different sources. In an embodiment, the content index generating module 220 initially generates the content index 122 by partitioning or dividing or fragmenting a media item into clips or segments based on certain domain-specific characteristics. For example, in the case of a basketball game, the video of a game can be divided into clips/segments based on possessions. There are typically on the order of two hundred possessions in an NBA game. In an embodiment, the content index generating module 220 further comprises an analysis module 222 which receives as input, gametracker type of data that is available to the content providing engine 100 along with the video recording of the game. In addition, the analysis module 222 can also receive as input, the game log which indexes events based on the game clock. Thus, based on such input data, the video recording of the basketball game can be initially divided into segments based on the characteristic specific to the basketball domain, namely, possessions. Similarly, a video recording of a baseball game can be initially divided into segments based on the domain-specific characteristic of pitches. There are on the order of two hundred and fifty such events per game. Thus, various media items are initially segmented based on their respective domain-specific characteristics. In one embodiment, the segments thus obtained can be stored as an archive of clips as part of the stored content 154.

In an embodiment, the analysis module 222 further identifies parts or segments of the media items and/or the segments or clips from the stored content 154 that are of particular user interest via information contained within the items or segments in addition to information received from the user monitoring module 210. In an embodiment, the analysis module 222 can further extract segments from media items, in addition to the initially obtained domain-specific segments, for storing within the database 110 based on user interest or other input as will be described herein. In an embodiment, the analysis module 222 is configured to identify those segments of media items that users may be interested in addition to the segments generated based on domain-specific characteristics. For example, in a NFL game, viewers can be interested in parts of video recordings showing Tim Tebow getting down on a knee to pray which may not be identified or extracted based on the domain-specific characteristics of football. Hence, such segments of media items are identified by the analysis module 222 based on the information received from the user monitoring module 210. Additionally, automated methods such as, analyzing audio/video information, text processing of closed caption information, Internet search queries, messages exchanged between users on social networks, official scoring of a game in the case of sporting events can be used to identify interesting segments of a video and to build the content index 122 in accordance with one embodiment.

In an embodiment, audio information associated with the video clip, such as, spectator applause can be employed in identifying segments of a video that can be of potential interest to the user. For example, in the case of sporting events, if the audio track is of good quality, a segment of the corresponding video recording can be identified as being of interest to the users based on the type of audience reaction to it. Thus, important player which are cheered loudly by the audience, or bad calls by referees in key moments of the game that elicit different reactions from the audience can be identified by the analysis module 222 from the audio track of the game.

In an embodiment, image processing data, such as, face recognition or recognition of other indicia such as, a uniform number of a player at a sporting event, camera angles, positions of players in certain sports like baseball or cricket can be employed to identify segments of a video that can be of interest to users. In an embodiment, the interesting segments can be identified and the associated metadata for the content index 122 can be created by human editors. In one embodiment, the indicia employed in identifying interesting segments of a media item can also be recorded as metadata associated with the particular segment within the content index 122.

The analysis module 222 thus analyzes the particular segments marked by the user monitoring module 210 as being associated with significant user behavior trends to obtain metadata corresponding to such segments. By the way of illustration and not limitation, the metadata associated with the segment can comprise a unique identifier (id) of the segment, an identity of the media item from which the segment is taken e.g., name of the event featured in the media item or title of the media item or media item id within the stored content 154, the type of media item e.g., audio/video item or format of the audio/video item, the temporal metadata associated with the media item e.g., time of occurrence if the media item is associated with a news event or a television show, entities associated with the media item e.g., personalities/locations/organizations/issues/animals associated with the media item, the start and the end times or time offsets of the segment within the media item, a sequence id identifying the particular segment in a sequence of segments generated from the media item and optionally identity of other segments within the media item with which an extracted segment can be linked. In an embodiment, an emotional metadata element can be associated with the media segment. The emotional metadata can be used to characterize a particular media segment as "funny", "spectacular" "important", "sad" or other adjectives. The values/adjectives for this metadata element can either be provided by human editors tagging the media item or it can be automatically derived by the analysis module 222 based on the adjectives included in the user comments or tags associated media segment or even live commentator input obtained by analyzing the sound track. Automated methods such as analysis of the audio/video data of the media, text processing of closed captioning information, user tags, messages exchanged by users on social networking platforms, or comments posted by the users and information available from the content provider publishing/broadcasting the media item can be employed in identifying the metadata of the segment.

Therefore, in one embodiment, the metadata can be partially obtained from the user monitoring module 210 itself in addition to being generated by the content index generating module 220 via automated procedures. The metadata identified by the analysis module 222 is provided to the generation module 224 which creates or updates the content index 122 within the database 110. The content index 122, in one embodiment, can comprise one or more database tables associated with particular content types or associated with particular event types within the same content type. For example, the content index 122 can have different metadata associated with audio segments and video segments. As detailed herein, the metadata associated with a media segment can be characteristics or attributes of the segment itself in addition to having certain domain-specific characteristics as metadata associated therewith.

In an embodiment, each segment recorded in the content index 122 has associated therewith a 'level of interest' variable as part of the metadata. The level of interest variable facilitates human editors or automated processes/modules to quickly identify segments that will be of interest to a greater number of users as compared to segments that will appeal to a more limited audience/users. In an embodiment, the level of interest variable can be associated with a finite number of values that define an increasing or decreasing scale of user interest. For example, the level of interest variable can have its values defined from the group of numbers [0, 1, 2, 3] with 0 indicating that the segment will appeal to few users while 3 indicates a potentially popular segment. Therefore, media segments with their level of interest variable set to 0 may be either be deleted completely from the dataset of media segments as being of low-value or they may be included in personalized content for only a limited number of users. For example, in the case of a video recording of a sporting event, segments associated with time-out breaks or beginning of possessions in a basketball game when players advance the ball to the opponent's court without any interesting action can be removed as being "low-value". If the level of interest variable is set to 3 for a media segment, it indicates that the segment will be likely be universally popular and hence can be included in almost all personalized content associated with the particular media item from which the segment is identified. In one embodiment, a segment having the level of interest variable set to 3 can be promoted as a stand alone clip to all the users receiving content from a content provider. It may be appreciated that the aforementioned scale is described by the way of illustration and not limitation and that other scales or modes can also be used to indicate the likelihood of popularity of a given media clip. In one embodiment, the popularity of a particular segment of a media item/content item can be predicted based on an initial data of users who executed particular actions such as but not limited to rewinding, repeatedly playing, tagging, forwarding to or discussing the segment with social contacts, pausing, playing at a certain speed, normalized over the total number of users who viewed or otherwise interacted with the media item. Thus, the generation module 224 can create or update the content index 122 to comprise the metadata of the segments extracted from media items.

The content providing engine 100 also comprises a personalized content generating module 230 which employs the content index 122 to generate personalized content in accordance with embodiments described herein. When a request for personalized content along with requisite parameters is received by the content providing engine 100, the personalized content generating module 230 employs the received parameters to identify from the content index 122 the relevant content such as, but not limited to, media items, segments of media items or combinations thereof that meet the user's parameters. In an embodiment, at least some of the user specified parameters can be matched to the metadata of the media items or segments of media items for retrieving the relevant content. The retrieved content is arranged in accordance with the user's parameters or other default settings as configured within the content providing engine 100 to generate personalized content 116 which is then transmitted for display to the user.

Figure 3:
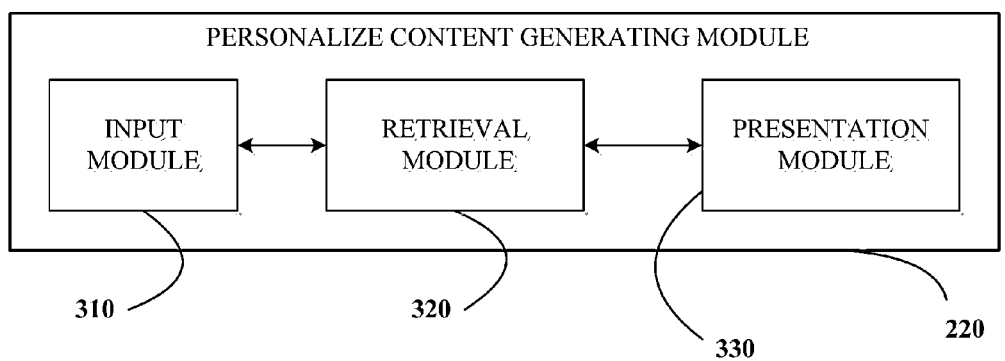
FIG. 3 is a block diagram depicting certain modules within the personalized content generating module in accordance with an embodiment of the present disclosure.

FIG. 3 is a block diagram depicting certain modules within the personalized content generating module 230 in accordance with an embodiment. The personalized content generating module 230 can comprise an input module 310, a retrieval module 320 and a presentation module 330. The input module 310 receives requests for content from user devices 102/104. In an embodiment, the request can be automatically generated, for example, upon the user clicking on a particular image displayed on the home page or customized highlights can be automatically generated based on user preferences preset within the content providing engine 100. In an embodiment, the request can be generated by a user who can specify various parameters for generating the personalized content. For example, for generating personalized highlights of a football game, users can specify how long a reel they want to see, whether they would like to see more offense than defense along with their preferred players. If all the requisite parameters for retrieving relevant content are not provided in the initial user request, a dialog can be conducted with the user in order to obtain the necessary information in accordance with an embodiment. In an embodiment, certain parameters such as, length of the personalized content to be produced or the number of segments to be included in highlights customized to a user request can be preset within the personalized content generating module 230. It can be appreciated that values for some of the parameters can be set by default based on values of other parameters. For example, based on the number of segments and length of each segment, the total time period of a reel of personalized highlights is set by default.

The information associated with a user request for personalized content obtained by the input module 310 is communicated to the retrieval module 320 which matches the parameters from the users requests or user queries with the metadata of media items as stored in the content index 122 and retrieves relevant content such as, one or more media items or relevant segments of media items or combinations thereof. In an embodiment, the retrieval module 320 is configured to identify or select those segments of media items whose metadata in the content index 122 matches the parameters in the user request as being relevant to the user. In an embodiment the retrieval module 320 can retrieve a plurality of media segments or clips which can be linked together or which may be overlapping. Such clip linking can either be based on domain-specific rules and can be additionally tuned with user input using standard learning rules.

The retrieved content is transmitted to the presentation module 330 which can further forward the content to the user device 102/104. In an embodiment, the presentation module 330 further arranges the content in accordance with predetermined parameters supplied by the user or as preset within the content providing engine 100. In an embodiment, the user can specify within the user query/request for personalized content, the parameters associated with arranging highlights of an event, such as a baseball game, which may be different from the actual temporal order of occurrence of the events. However, the presentation module 330 arranges the segments of the highlights of the game in accordance with the user-specified parameters thereby providing content personalized to the user's preferences. In an embodiment, presentation module 330 can arrange the segments in a default order based on data available within the content providing engine 100.

Figure 4A:
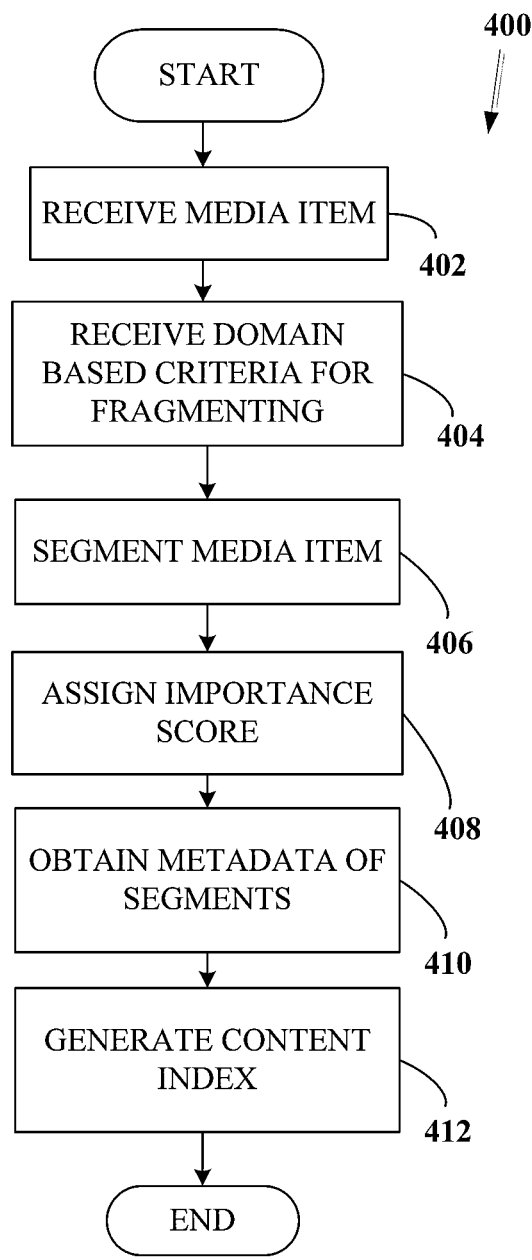
FIG. 4a shows a flow chart illustrating an embodiment of a method of generating a content index in accordance with one embodiment.

FIG. 4a shows a flow chart 400 illustrating an embodiment of a method of generating a content index. The method begins at 402 wherein a media item is retrieved either from content stored in a database or via a feed manager. At 404, the domain based characteristic or criterion for dividing the media item into segments are obtained. In one embodiment, the criteria domain-specific criteria for segmenting a media segment can be determined by a human editor. Different criteria can be set within the content providing engine for fragmenting different media items or extracting segments from the media items based on the criteria that are unique to the domains with which such items may be associated. In one embodiment, the domain of a media item can depend on the type of event recorded by the media item. This can facilitate obtaining characteristics for segmenting the media item. In one embodiment domains can be broadly defined as a political, sporting or cultural domains. By the way of illustration and not limitation, domains can be defined more specifically e.g., the sports domain can be further divided based on different types of sports such as football, basketball, baseball, cricket etc., or the cultural domain can be further divided into television, concerts, Internet content, movies etc. The media item is thus segmented based on domain-specific characteristics as shown at 406.

At 408, an importance score is determined for each of the segments relative to other segments extracted from the media item. For example, in a recording of a sporting event, a segment associated with a game changing event can have the highest importance score. In an embodiment, the importance score can be a relative rank of a segment normalized by the number of segments extracted from the media item. In an embodiment, the importance score can be uniformly defined for the segments across various domains. This facilitates comparison of various clips or segments from different domains for inclusion into the personalized content. Thus, the content providing engine 100 can determine whether to show a third highlight from game 1 or the second highlight from game 2 even if game 1 and game 2 belong to different domains.

In one embodiment, the importance score of a segment can be obtained or updated via user interaction data obtained from online sources such as but not limited to, social networking platforms or search engines. In an embodiment, the importance score can be the same as the level of interest variable described supra. In an embodiment, an importance score can differ from the level of interest variable for a given segment since a particular incident recorded in a segment may be of great interest to the users but may not be important to the proceedings at an event. The difference in the level of interest variable and the importance score can indicate such segments.

In an embodiment, data on search queries can be used to identify particularly important subjects or segments in media items. For example, search data regarding NFL player names can be analyzed and if a particular player (like "Ben Roethlisberger") experiences more queries than usual in a particular hour, the importance score of clips relating to that player can be increased as it is most likely that there was a particular play that stimulated such searches. Additionally, more specific data on search queries such as, "Roethlisberger touchdown third quarter", can help narrow down which particular segment of the corresponding game should be promoted. The importance score can thus increase the probability that the particular video segment is included in the personalized content provided to users. Similarly, for a political debate, users can search particular phrases of speeches/answers and that can help in identifying popular segments and setting their importance score. The importance score thus determined can be further augmented or adjusted via feedback from users of the content providing engine 100 as will be detailed further infra.

At 410, different metadata associated with each of the segments as detailed herein is obtained. As discussed supra one of the metadata that is obtained can include temporal metadata associated with the beginning and the ending time of the segment. In one embodiment, the temporal metadata can comprise a plurality of starting points and/or ending points so that personalized highlights of different time periods can be generated. Therefore, in accordance with this embodiment, segments of a media item can comprise two starting points one for longer highlights and one for shorter ones thereby providing greater flexibility in customizing the end product. For example, if a user wants to see highlights from a particular sporting event, then the longer highlights can be shown whereas shorter highlights can be shown if the user requests to see all dunks by a particular basketball player over the previous month. In accordance with an embodiment, a database entry is generated for each of the segments in a database table corresponding to a respective domain which comprises appropriate data structures to receive the metadata of the segments and the metadata thus obtained for the segments is stored in respective database entries in the content index 122 as shown at 412. In an embodiment, the importance score of each segment obtained at 408 can be part of the metadata associated with the segments and hence can be stored in the content index 122.

Figure 4B:
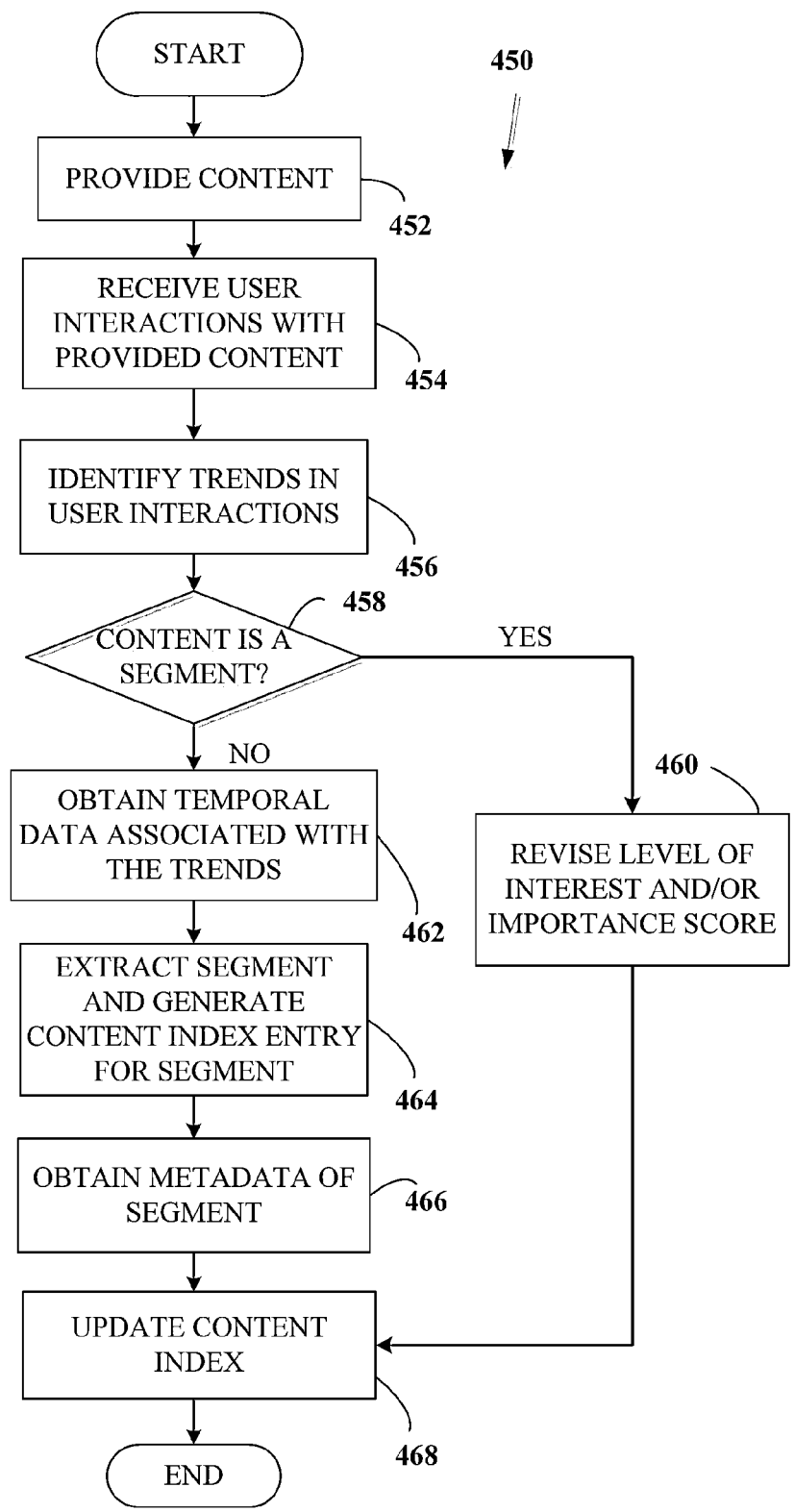
FIG. 4b shows a flowchart illustrating an embodiment of a method of generating or updating a content index in accordance with one embodiment.

FIG. 4b shows a flowchart 450 illustrating an embodiment of a method of generating a content index. The method begins at 452 wherein content is provided to a plurality of users. In an embodiment the content can comprise a media item such as an audio item including but not limited to, an audio recording of a speech, a song or a commentary of a sporting event. In an embodiment, the media item can be a video item, such as but not limited to, a live or recorded video transmission of a sporting event, a news event, a movie or a network program broadcast via television or Internet channels. In an embodiment, the content provided to the users can comprise personalized highlights or segments from a plurality of media items selected based on the users' preferences.

At 454, behavioral data of the plurality of users, for example, various user interactions or inputs provided by the plurality of users as they perceive the received content are recorded. In an embodiment, the user events generated from the audio/video players employed by the users via their devices 102/104 can be recorded. These can comprise without limitation, fast forwarding, rewinding, pausing, tagging, playing at a lower speed, downloading, forwarding to contacts or other ways that users can interact with a media item. Accordingly, at 456, significant trends in user behavior that occur as the users perceive the received content are identified as will be detailed further infra. At 458, it is determined if the content associated with the significant behavioral trends is a segment of a media item which already has an existing database entry recorded in the content index 122. If there is a pre-existing database entry for the content in the content index 122, it is determined that the content is a segment. Accordingly, one or more of the level of interest variable and importance score can be revised or recalculated as shown at 460 based on new behavioral trends identified at 456. For example, the media player providing the content can include tools to allow users to up-vote or "like" an interesting or important clip in addition to allowing them to tag the clip with descriptive words they find helpful. Also, analyzing data on user views of each media segment can facilitate in determining the importance score of the segment. Thus, if a user views a clip a second time, it can be determined with substantial certainty that the segment is important. Thus, the content providing engine 100 can employ user feedback associated with the personalized highlights or content initially provided to the user in further refining an initially determined importance score of a media segment. The determination on whether the importance score and/or the level of interest variable should be updated can be based on whether the segment shows content that is significant to the event which can be derived via other metadata such as but not limited to the special event metadata element as described herein. The content index 122 is then updated with the new value(s) as shown at 468 and the procedure terminates on the end block.

If it is determined at 458 that the content associated with significant user behavior is not a segment, temporal data associated with the significant user trends is obtained. For example, the beginning and the ending time offsets of the part of the media item which is associated with the user behavioral trends is obtained as shown at 462. Based on the temporal data, the segment can be extracted for storage in e.g., stored content 154 and an entry for the new segment is created in the content index 122 as shown at 464. Thus, the segments of media items associated with significant user behavior will be determined as being particularly interesting to the users.

At 466, metadata associated with the interesting segments is obtained. For example, in the case of a speech discussed supra, the users' rewinding of a specific part of the speech indicates particular user interest in that segment of the speech. Similarly, in the case of the video of the sporting event, a significant number of users watching a particular segment of the video in slow motion indicates that an interesting event featured in that segment. Accordingly, indicia identifying the particular segment of the speech or video, such as, time offsets for longer and/or shorter highlights can be recorded at as part of the metadata associated with the segments as shown at 466. In addition, other metadata such as, the personalities or other entities featured in the particular segment, a topic of the particular segment, a type of play or other metadata can be obtained. As described supra, the metadata can be based on the type of event featured in the segment. In an embodiment, a human editor can define metadata to be collected for various event types/domains or for different types of media items. For example, the metadata generated for a news event can differ from the metadata associated with a sporting event. Even within a particular type of event, the metadata generated can vary based on further categorization of the event type. For example, the metadata associated with different sports, such as football, chess or hockey can vary. Similarly, the metadata associated with different news events can vary based on a sub-categorization of the news segment. For example, the metadata associated with a political news event can differ from the metadata associated with a financial news event or a news event related to a natural phenomenon such as a natural disaster. In an embodiment, the metadata obtained at 466 can also comprise metadata generated based on user interaction data obtained at 454. For example, an initial value for the level of interest variable for each of the segments can be determined at 466. At 468, the metadata thus obtained is recorded to the content index 122. The content index 122, in accordance with one embodiment, can be an indexed database table comprising the metadata which in turn is linked to an archive (e.g., stored content 154) within the database 110 comprising one or more of media items or interesting media segments or clips isolated from the media items. In an embodiment, the database table that makes up the content index 122 may also comprise the interesting media segments stored therein.

Figure 5:
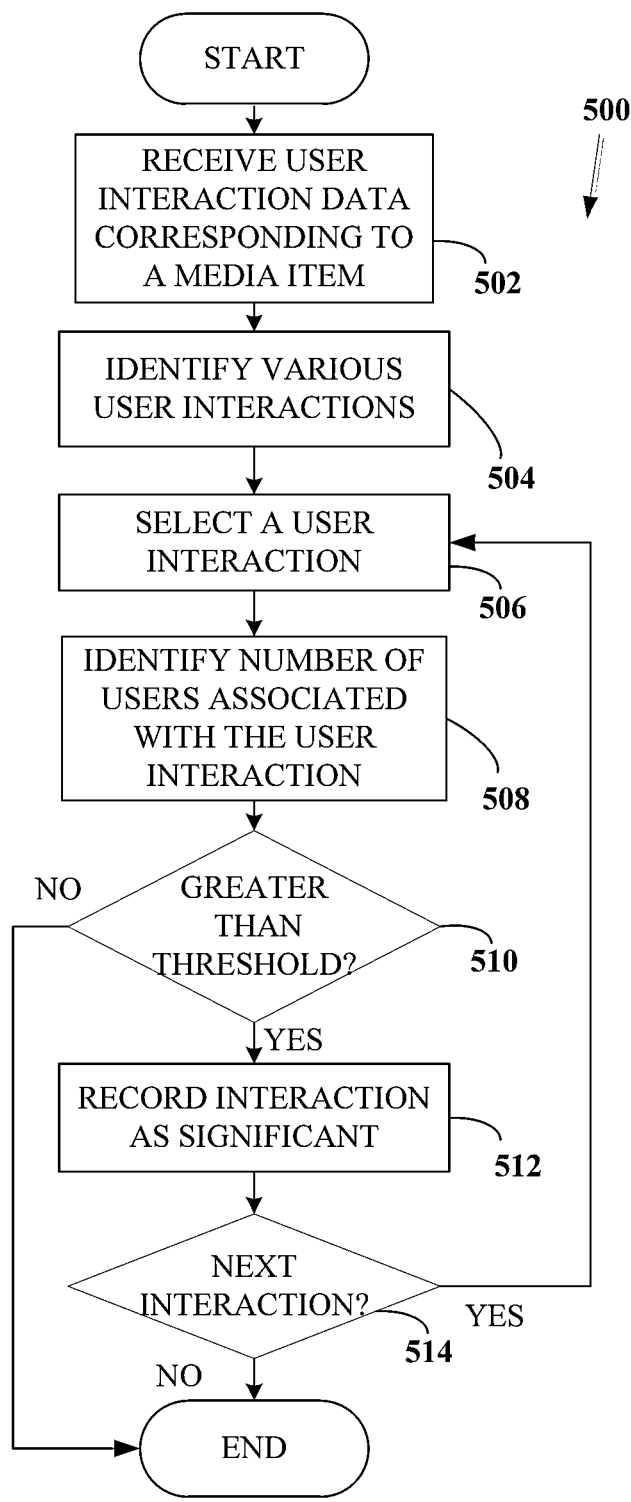
FIG. 5 shows a flowchart illustrating an embodiment of a method of obtaining significant user interaction data in accordance with an embodiment.

FIG. 5 shows a flowchart 500 illustrating an embodiment of a method of obtaining significant user interaction data. The method begins at 502 wherein user interaction data corresponding to a media item is obtained. As discussed supra, the users can choose to interact in different ways with the media item while perceiving it and at 502, such interaction information comprising various user actions that were executed and the time offset associated with the media item at which they were executed are obtained. In an embodiment, the user actions can be recorded in terms of other metadata, such as entities associated with the media item. At 504, the different user interactions, such as but not limited to, fast forwarding, rewinding, playing at a particular speed, repeated play are identified from the data obtained at 502. At 506, one of the user interactions is selected in accordance with one embodiment. It can be appreciated that the processing of user interactions is shown as occurring serially only by the way of illustration and that all the user interactions can be processed simultaneously in parallel in a similar manner. At 508, the number of users associated with the selected user interaction is obtained and compared with a particular threshold as shown at 510. In an embodiment, the threshold for each user interaction can be defined based on the selected interaction and/or the media item associated with the user interaction data thereby aiding in more accurately determining the trends in the user interaction data. If the number of users associated with the selected interaction is less than the threshold at 510, the selected user interaction is not recorded and the process terminates on the end block. If the number of users associated with the selected user interaction is greater than the threshold at 510, then the user interaction selected at 506 is recorded as a significant user interaction as shown at 512 which may be indicative of particular user interest or lack thereof in accordance with embodiments as detailed herein. At 514, it is determined if a next user interaction can be identified from the user interaction data. If yes, the process returns to 506 for processing the next interaction, else it terminates on the end block.

Figure 6:
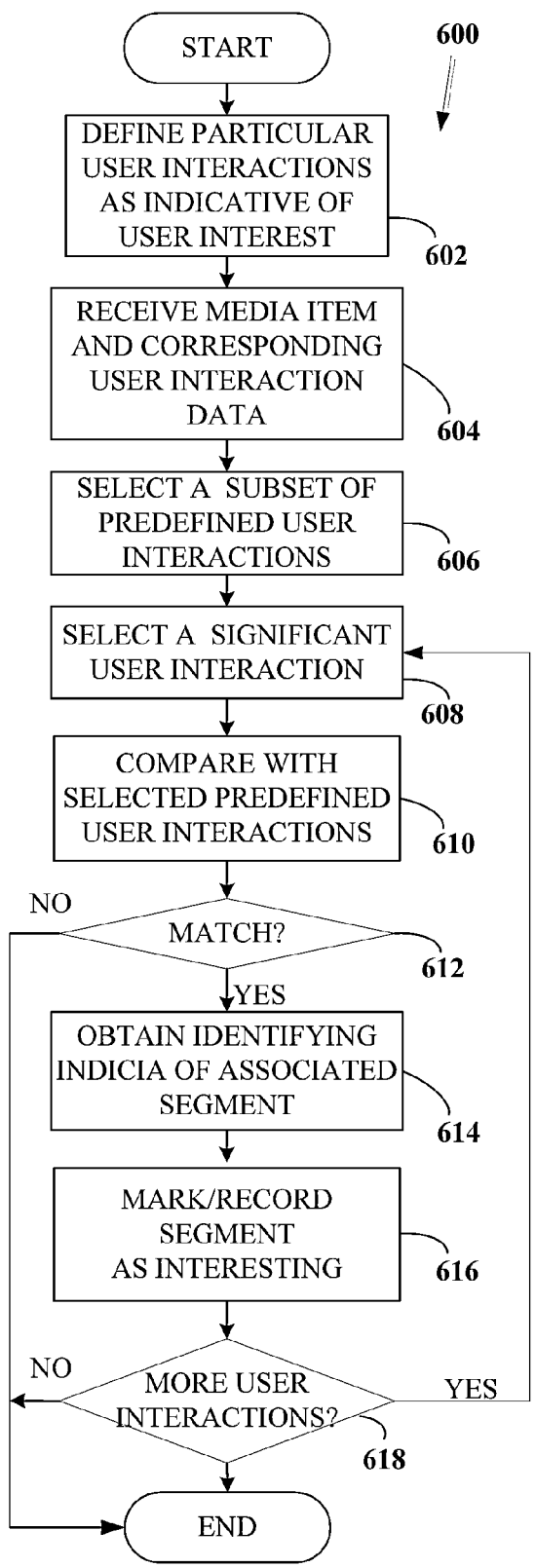
FIG. 6 shows a flowchart illustrating an embodiment of a method of identifying interesting segments of media items in accordance with one embodiment.

FIG. 6 shows a flowchart 600 illustrating an embodiment of a method of identifying interesting segments of media items. The method begins at 602 wherein particular user actions can be defined within the content providing engine 100 as being indicative of particular user interest. In an embodiment, they are defined by human editors. Users perceiving a media item can interact with the media item in several ways. For example, if the media item is a video, they may view it entirely at normal speed taking the time required to actually play the media item. In other instances, the users can rewind certain parts or segments or clips of the media item to play it again or share them with social contacts or tag them with comments. Such user actions are indicative that those parts or segments or the media item itself are particularly interesting to the users. For example, if the media item provided to the users at is an audio recording of a speech, a large number of the users may pause at a particular point and rewind a specific part of the speech. Similarly, if the media item is a video of a sporting event, a significant number of users may rewind and watch a particular segment of the video in slow motion. In an embodiment, real-time online user activity data can be indicative of interesting parts of the media items. Such real-time user activities can include without limitation, data feeds from online social networking sources such as TWITTER or data from search queries. Hence, such user actions can be predefined as being indicative of user interest. Other interactions, such as downloading the media item or forwarding the media item can also be considered as indicative of particular user interest. In an embodiment, different sets of user interactions can be predefined within the content providing engine 100 as being indicative of user interest for different media item types or for different events featured in different media items. For example, a user action of playing at a lower speed can be indicative of user interest in relation to a video whereas it is not particularly relevant to an audio item. Similarly, user adjustment of finer audio controls, such as bass, treble, can be indicative of user interest in relation to an audio/video item such as a musical recital and may have little or no relevance to a media item associated with, for example, a motor racing event. At 604, a particular media item along with stored user interaction data indicative of significant trends in user interactions is received. As described supra, the actions executed by a significant number of users who perceive the media item are received at 604 as part of the trends in the user interaction. In an embodiment, a plurality of trends associated with a plurality of user interactions can be obtained at 604. The trends or their associated interactions can be ordered based on, for example, the number of users associated with each of the plurality of user interactions. At 606, a particular subset of user interactions predefined at 602 can be further selected based on the type or media item and/or the events featured in the media item in accordance with an embodiment. At 608, one of the significant user interactions is selected and compared with the predefined user interactions as shown at 610. If at 612, it is determined that there is no match, the process terminates on the end block. If at 612, the selected user interaction matches one of the predefined user interactions from the selected subset of user interactions, the identifying indicia of the corresponding segment of media item associated with the significant user interaction are obtained at 614. In an embodiment, the indicia identifying the segment of the media item can be time period associated with the significant user action. For example, if it is determined that a large number of users replayed a particular segment of the media item, the identifying indicia of the segment of the media item can be the beginning and the ending time offsets associated with the user replay. In an embodiment, data from social networking sources like TWITTER can provide users real-time tweets to their contacts about a certain incident. The temporal metadata of such tweets such as the minute and seconds of the tweets, as well as the text of the tweet can be used to identify a particularly interesting incident at a live event such as but not limited to a political, cultural or sporting event. Accordingly, the segment is marked/recorded within the database 110 as being of interest to the user as shown at 616. At 618, it is determined if a next user interaction needs to be analyzed. If yes, the process returns to 608 wherein the next user interaction is selected for analysis else the process terminates on the end block.

Figure 7A:
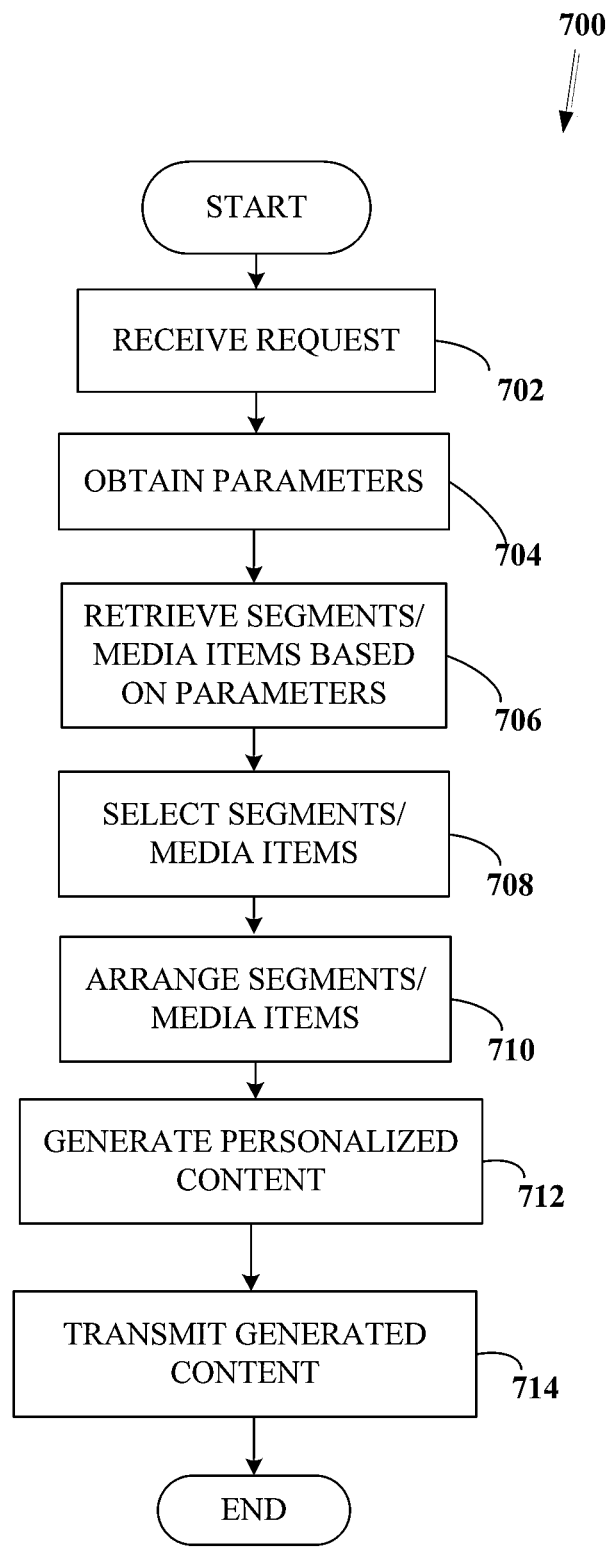
FIG. 7a shows a flowchart illustrating an embodiment of a method of generating personalized content in accordance with one embodiment.

FIG. 7 shows a flowchart 700 illustrating an embodiment of a method of generating personalized content. The method begins at 702 wherein a request for personalized content is received. In an embodiment, the request can be made a user who desires to receive personalized content/media items tailored or customized to particular parameters provided implicitly or explicitly in the request. For example, the user can press a button on a user interface while logged into a Fantasy mobile 'app' or while logged into Fantasy sports in a browser, in order to request personalized content. In an embodiment, the request can be generated automatically for updating a user when the user logs into the user's account associated with a certain service platform, e.g., Fantasy Sports or the request can be automatically generated if the user's account is to be periodically updated. At 704, various parameters associated with personalized content are obtained. In an embodiment, the user request can be parsed and analyzed via natural language processing techniques to obtain data/metadata associated with the user query. In an embodiment, additional parameters, such as those not supplied in the user request, can also be preset within the content providing engine 100. At 706, various content items such as media items or segments of media items or combinations thereof are obtained based on the parameters. In an embodiment, the parameters obtained from the user request are matched to the metadata associated with media items and/or segments of media items from the content index 122 and those content items whose metadata matches the parameters are obtained. At 708, a subset of the retrieved content items can be selected for presentation to the user. In an embodiment, when sufficient number of content items are not retrieved this step can be omitted. However, if a large number of content items or greater number of content items than a number specified in a request are obtained, a subset of the retrieved content items can be selected as shown at 708. In an embodiment, the content items can be selected based on their respective level of interest variables. In an embodiment, the content items can be selected based on their respective importance scores. At 710, the retrieved/selected content items are arranged in accordance with various criteria. In one embodiment, the criteria can include implicitly or explicitly provided user preferences. If no user preferences are provided, the media items may be arranged in a default order. In an embodiment, the user preferences can be obtained from the various parameters obtained at 704. For example, if the media segments are obtained from media items related to sports/news events, then such segments may be arranged in a default order of a temporal sequence of occurrence of events or in the descending order of their respective importance score if the user does not specify a particular order for arranging the segments. In an embodiment, the user can provide an sequential list of entities in which to order the retrieved media items/segments. For example, the user can specify a list of players in a descending order of preference whose plays the user desires to see. In an embodiment, the media items can be ordered based on a combination of user preferences and parameters/metadata of the segments as given in the content index 122. Accordingly, segments or media items featuring the user's preferred players are arranged in the user specified order and within the user specified order they may be arranged based on their respective values of level of interest variable for transmission to the user. In an embodiment, the segments showing highlights of a sporting event featuring the user's preferred player/team can be arranged in order of the user's preferences rather than the temporal sequence of occurrence of the events. At 712, personalized content is generated from the content items thus arranged. In an embodiment, the personalized content can include context relevant advertisements in addition to the retrieved content items. The personalized content is transmitted to the user as shown at 714.

Figure 7B:
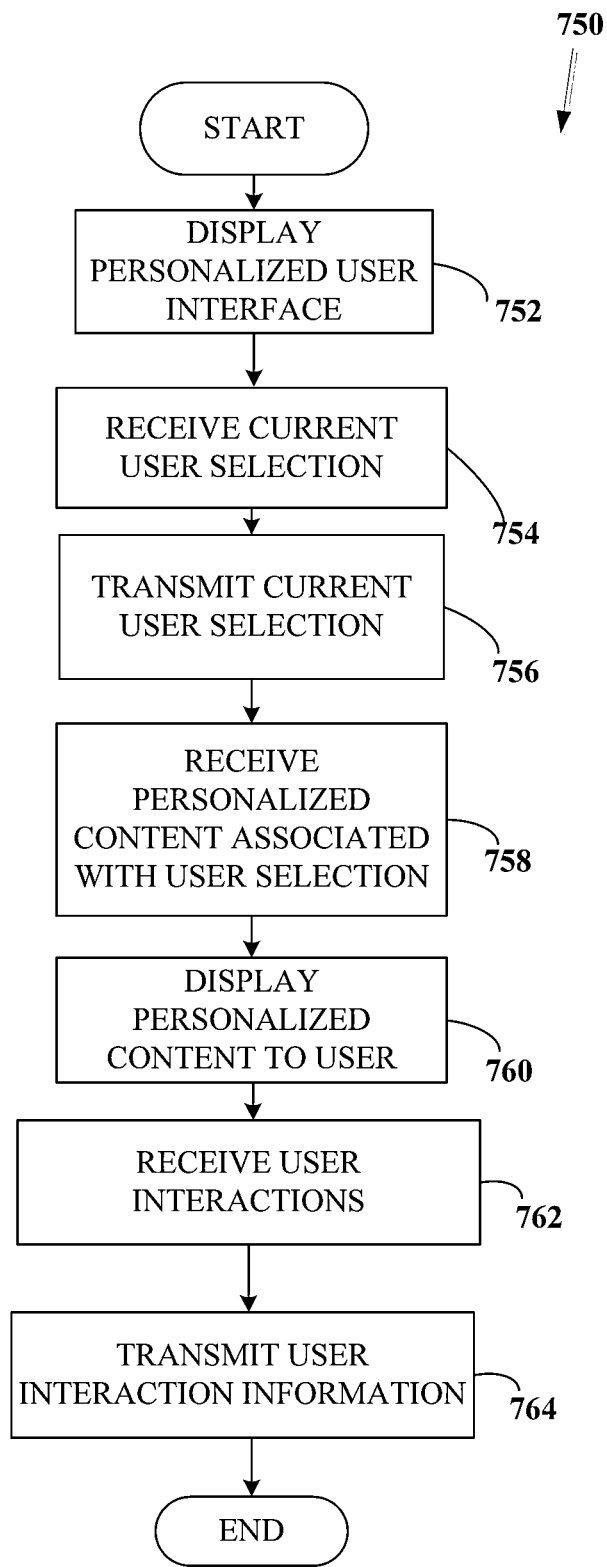
FIG. 7b shows a flowchart illustrating an embodiment of a method of providing personalized content in accordance with one embodiment.

FIG. 7b shows a flowchart 750 illustrating an embodiment of a method of providing personalized content in accordance with one embodiment. The method begins at 752 wherein a personalized home page or a personalized user interface screen associated mobile app is displayed. The personalized home page can be associated with a content provider providing personalized content to the user. In an embodiment, the content provider can provide personalized sports content to a user based on the user's Fantasy Sports account. In an embodiment, the personalized home page of the user can include information associated with a plurality of entities such as players on the user's Fantasy Football roster or sports events that the user has explicitly expressed interest or events suggested by the content provider as being of likely interest to the user. At 754, a current user selection of one of the entities is received. For example, the user can click on an image of a player in the user's roster of players or the user may select an event to receive highlights of the event. In an embodiment, the user can provide a combination of the aforementioned parameters so that the user selects an event and a player featured in the event for receiving personalized content. At 756, the user's current selection is transmitted to the content provider. At 758, content personalized based on the user selection is received. Thus, the content received can include user selected entities, such as, player or event or combinations thereof. In an embodiment, the personalized content transmitted to the user can comprise different segments or clips or fragments of media items featuring the user selected player/event which have high values of a level of interest variable which indicate that users who viewed media items from which the segments were selected found the selected segments of the media items most interesting. For example, the previous users may have expressed their interest when they scrolled back to view the segments in slow motion or viewed the segments a plurality of times or tagged the segments or shared information about the segments with social contacts. Accordingly, the level of interest variable gets updated based on such user interactions as described herein and those segments with level of interest variable values indicative of high user interest are selected for inclusion into the personalized content received at 758. The received personalized content is displayed to the user as shown at 760. At 762, user interactions with the personalized content executed as the content is being displayed to the user are received. The user interactions can include the aforementioned actions indicative of high user interest. For example, a tool for tagging media items can be provided on the user interface so that the user can tag the media item. In an embodiment, the user interactions can also include interactions such as fast forwarding or skipping to a next clip via a skip button on the user interface which can indicate low user interest. At 764, information regarding such user interactions is transmitted to the content provider so that the content provider can update the level of interest variable and/or other metadata of the segments accordingly.

FIG. 8a is a schematic diagram illustrating a data structure comprising domain-specific metadata associated with basketball games in accordance with one embodiment. It may be appreciated that the metadata is described herein only by the way of illustration and not limitation and that other features of the event and/or the domain can also be included in different embodiments. As described herein a video recording of a basketball game is segmented based on possessions. In an embodiment, each segment of a video recording of a basketball game can comprise segment metadata that is generally defined for all segments as described herein such as but not limited to, starting and ending times of the segment, total time period of the segment, a level of interest variable, importance score, a unique identifier for the segment within a database table, in addition to the domain-specific metadata described below. In an embodiment, additional metadata can be described via tags as appropriate. For example, difference between "live possessions"—regular plays and "dead-ball possessions" i.e. free throws can be conveyed via tags. Upon segmentation, a database entry is created for each segment to store respective values for the attributes listed in the metadata structure 800 which is comprised in the content index 122. Thus, each database entry for each segment can comprise:

a. Time of the game 802,
 b. The current score 804,
 c. Which team is in the possession of the ball 806,
 d. What is the result of the possession (score, turnover, steal, miss, block, rebound) 808,
 e. List of all the players on the floor at the time of the possession 810,
 f. List of players involved in the outcome of the possession and their involvement 812. For example, if it is a possession ending in a score, the name of the player taking the shot and the player who assists. If it is a miss, the names of the player taking the shot and rebounding. This data can be obtained from the "gametracker" type of stream. In an embodiment, additional data can be added to this entry (for example, who was assisting on a shot that was a miss).
 g. The result of the following possession 814—For example, if a missed shot leads to a quick score of the opponents, it is an indicator of a fast break after a miss, which makes the two possessions a candidate for a segment showing the highlight.
 h. Some of the plays may end up in technical or flagrant fouls 816—some of them later leading to a fine by the league. These events along with other events which may or may not particularly relate to the game can be added to the metadata under the special events entry.

FIG. 8b is a schematic diagram illustrating a data structure comprising domain-specific metadata associated with baseball games in accordance with one embodiment. It may be appreciated that the metadata is described herein only by the way of illustration and not limitation and that other features of the event and/or the domain can also be included in different embodiments. As described herein a video recording of a baseball game is segmented based on pitches. Upon segmentation, a database entry in a metadata structure 850 comprised in the content index 122 is created, which database entry for each segment can comprise the below described domain-specific metadata in addition to the general metadata described herein in accordance with different embodiments. The video meta data can comprise details such as, inning, pitch, count, number of outs and position of baserunners. In particular, the metadata for a media item associated with a baseball game can comprise:

a. Standard score data 854: inning, number of outs, current count, which players are on the field, who is on which base. Additionally, the x,y coordinates of the position of each pitch, the speed of the pitch and the "break" or "curve". This data is available through the data feed and is known as PitchFx.
 b. At-bat identifier 856, so all pitches within one at-bat can be easily grouped, so a fantasy sports user can see easily all at bats of a player on his roster.
 c. Ranking of pitch importance within at-bat 858. Typically the most important pitch will be the last pitch (because there was a hit, out or walk associated with it) but other important pitches could include: particularly bad calls on would-be walks or strike outs (which can be identified from the PitchFx data), steals, etc. If a player strikes out, all three strikes might get high "importance" scores.
 d. Bad call identifier 860. This is when the PitchFx data indicates a strike (ball) and the pitch is actually called a ball (strike).
 e. Result of the at bat (for all pitches within that at bat) 862.
 f. "Game changing" identifier 864. Using win probabilities the impact of each pitch (and the resulting play) had on the outcome of the game can be obtained. This can facilitate searching or creating highlights, such as "show me the 4 most important plays of this game" or "show me the 10 most important hits by this player all year."
 g. Special events 866 at that pitch and at that at bat: pick-off attempt, steal, balk, or other events.

Figure 9:
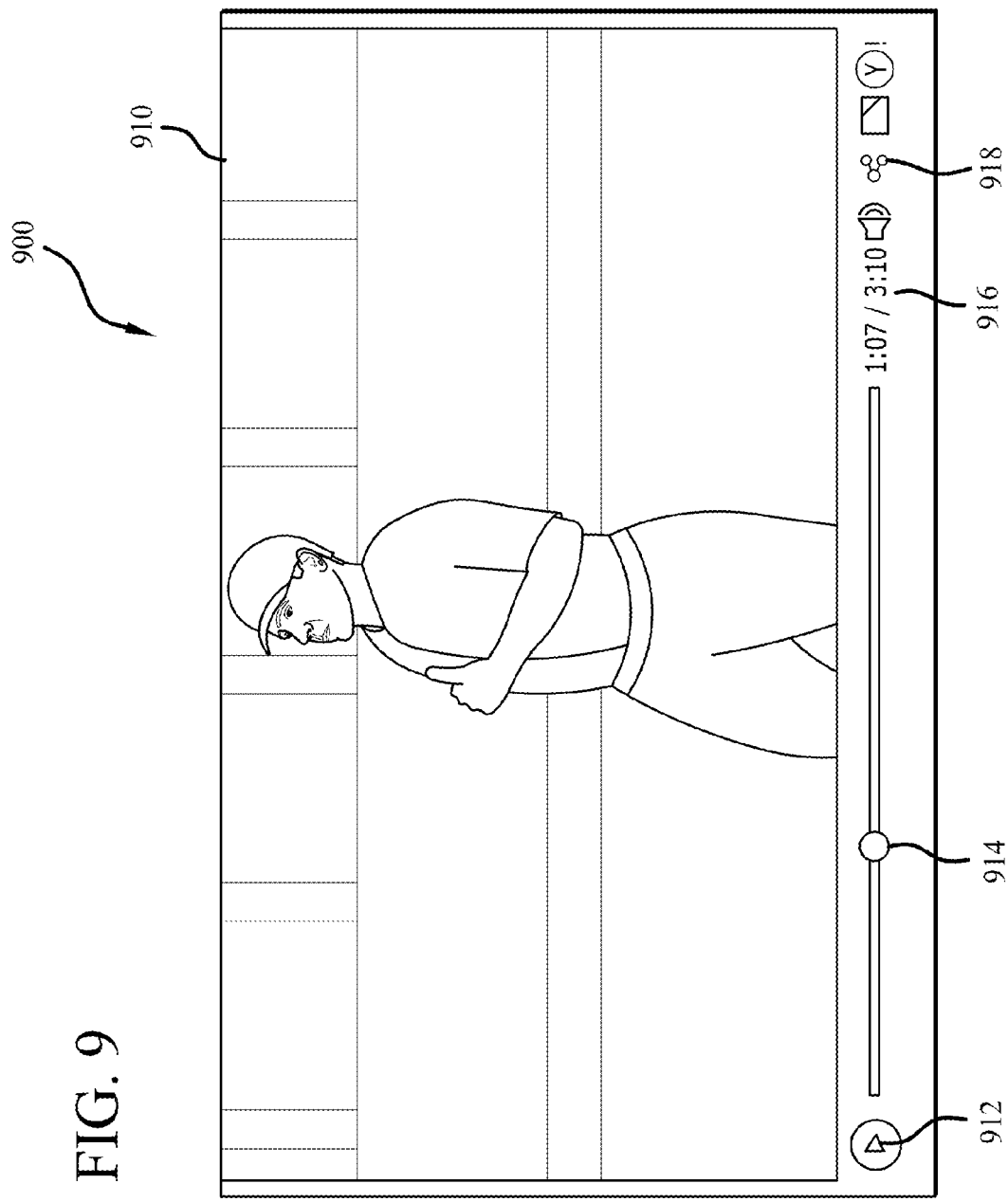
FIG. 9 is an illustration showing a media player playing a video recording of a sporting event in accordance with one embodiment.

FIG. 9 is an illustration 900 showing a media player 910 playing a video recording of a sporting event. The media player 910 comprising different user controls can be employed to present personalized content to the user on various user devices 102/104 and it can also be employed to collect different user interaction data to identify interesting segments of the video recording in accordance with embodiments detailed herein. The media player has play/pause control 912 which allows a user to play or pause the recording and a slider control 914 which allows a user to fast forward or rewind a recording thereby allowing the user to play the recording at particular speeds. Therefore, if a user rewinds specific segments of the video recording the data from the timer 916 can be obtained to identify the particular segments of the video which the user found interesting. In addition the user is also provided with control element 918 which allows the user to share e.g., email, tweet, etc., the video recording with his/her social network, thereby further indicating interest in the video recording. In an embodiment, user comments to the social networking contacts while sharing the video can be analyzed to identify user preferences and the type of reaction from the user to the content in the video recording. Such information can be used to generate the metadata for the video recording or segments extracted from it. Additionally, controls can be further provided in the media player to allow the users to tag the video recording with comments that are indicative of their reactions, such as, "funny", "interesting", "spectacular" or other tags to particular segments of the video. Further controls can be provided to allow the user to up-vote or "like" the particular segment which can facilitate promoting the segment to other users.

Figure 10:
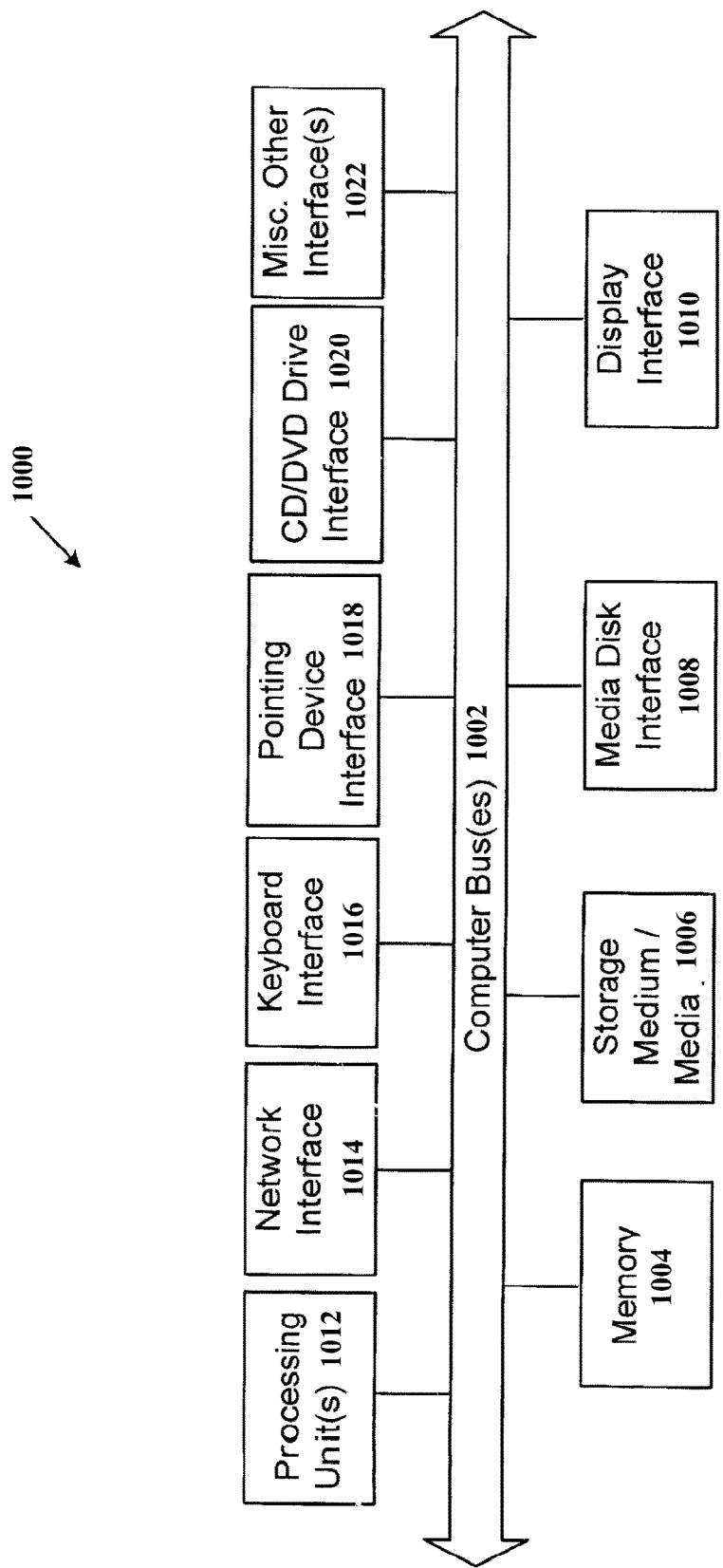
FIG. 10 shows internal architecture of a computing device which includes one or more processing units (also referred to herein as CPUs), which interface with at least one computer bus in accordance with one embodiment of the present disclosure.

As shown in the example of FIG. 10, internal architecture of a computing device 1000 includes one or more processing units (also referred to herein as CPUs) 1012, which interface with at least one computer bus 1002. Also interfacing with computer bus 1002 are persistent storage medium/media 1006, network interface 1014, memory 1004, e.g., random access memory (RAM), run-time transient memory, read only memory (ROM), etc., media disk drive interface 1008, an interface 1020 for a drive that can read and/or write to media including removable media such as floppy, CD-ROM, DVD, etc., media, display interface 1010 as interface for a monitor or other display device, keyboard interface 1016 as interface for a keyboard, pointing device interface 1018 as an interface for a mouse or other pointing device, and miscellaneous other interfaces 1022 not shown individually, such as parallel and serial port interfaces, a universal serial bus (USB) interface, and the like.

Memory 1004 interfaces with computer bus 1002 so as to provide information stored in memory 1004 to CPU 1012 during execution of software programs such as an operating system, application programs, device drivers, and software modules that comprise program code, and/or computer-executable process steps, incorporating functionality described herein, e.g., one or more of process flows described herein. CPU 1012 first loads computer-executable process steps from storage, e.g., memory 1004, storage medium/media 1006, removable media drive, and/or other storage device. CPU 1012 can then execute the stored process steps in order to execute the loaded computer-executable process steps. Stored data, e.g., data stored by a storage device, can be accessed by CPU 1012 during the execution of computer-executable process steps.

Persistent storage medium/media 1006 is a computer readable storage medium(s) that can be used to store software and data, e.g., an operating system and one or more application programs. Persistent storage medium/media 1006 can also be used to store device drivers, such as one or more of a digital camera driver, monitor driver, printer driver, scanner driver, or other device drivers, web pages, content files, playlists and other files. Persistent storage medium/media 1006 can further include program modules and data files used to implement one or more embodiments of the present disclosure.

Figure 11:
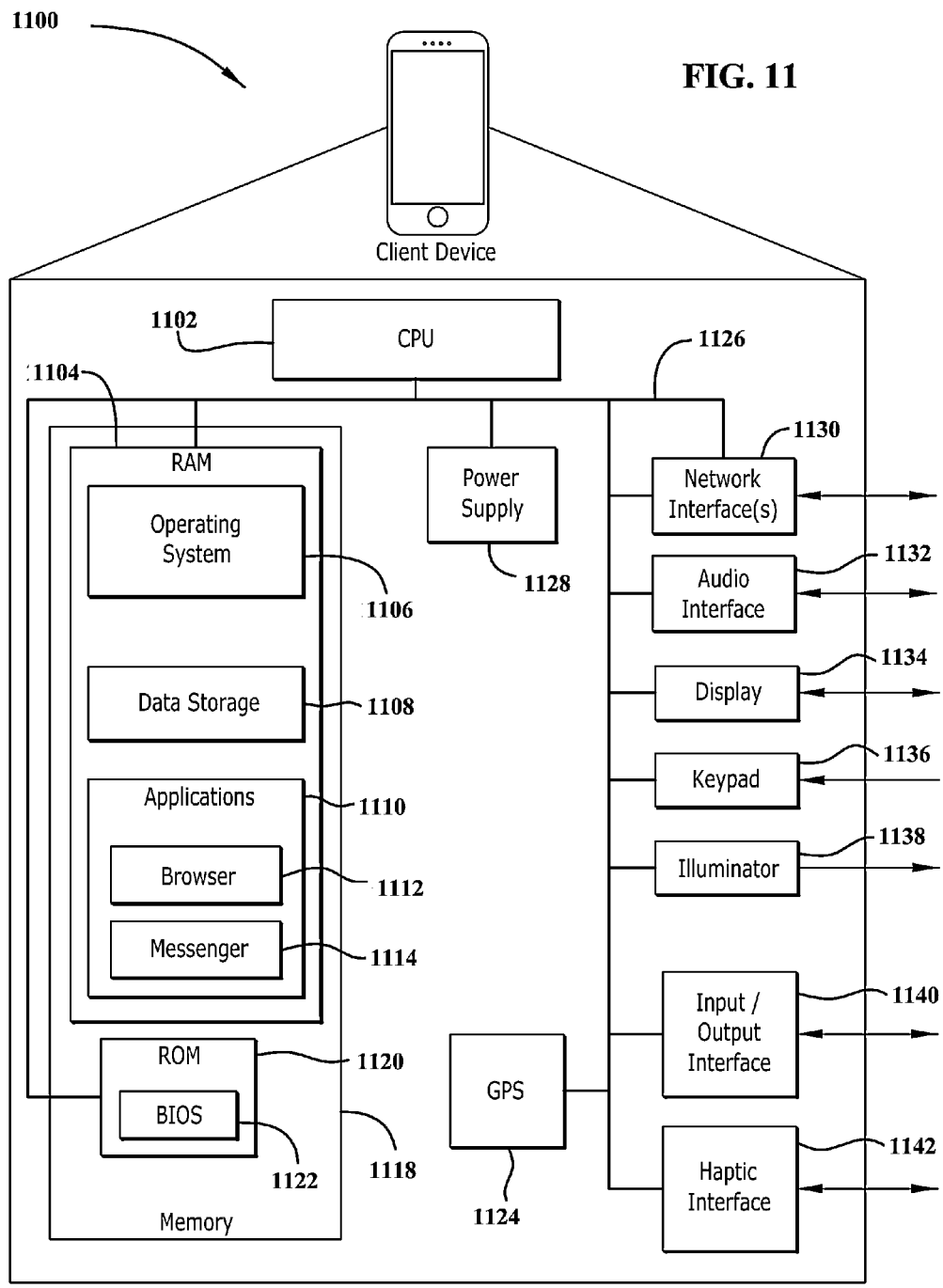
FIG. 11 is a schematic diagram illustrating a client device implementation of a computing device in accordance with embodiments of the present disclosure.

FIG. 11 is a schematic diagram illustrating a client device implementation of a computing device in accordance with embodiments of the present disclosure. A client device 1100 may include a computing device capable of sending or receiving signals, such as via a wired or a wireless network, and capable of running application software or "apps". A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. The client device can include standard components such as a CPU 1102, power supply 1128, a memory 1118, ROM 1120, BIOS 1111, network interface(s) 1130, audio interface 1132, display 1134, keypad 1136, illuminator 1138, I/O interface 1140. Claimed subject matter is intended to cover a wide range of potential variations. For example, the keypad 1136 of a cell phone may include a numeric keypad or a display 1134 of limited functionality, such as a monochrome liquid crystal display (LCD) for displaying text. In contrast, however, as another example, a web-enabled client device 1100 may include one or more physical or virtual keyboards 1136, mass storage, one or more accelerometers, one or more gyroscopes, global positioning system (GPS) 1124 or other location identifying type capability, Haptic interface 1142, or a display with a high degree of functionality, such as a touch-sensitive color 2D or 3D display, for example. The memory 1118 can include Random Access Memory 1104 including an area for data storage 1108.

A client device may include or may execute a variety of operating systems 1106, including a personal computer operating system, such as a Windows, iOS or Linux, or a mobile operating system, such as iOS, Android, or Windows Mobile, or the like. A client device 1100 may include or may execute a variety of possible applications 1110, such as a client software application 1114 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 1100 may also include or execute an application to communicate content, such as, for example, textual content, multimedia content, or the like. A client device 1100 may also include or execute an application 1112 to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method of providing personalized content, comprising:
   providing, by a computing device, user access to media items from a plurality of domains, the media items having respective domain-specific metadata associated therewith;
   receiving, by the computing device, a request for personalized content for a user, the personalized content being generated from at least one of the domains;
   obtaining, by the computing device, parameters associated with the request;
   accessing, by the computing device, a content index comprising the respective domain-specific metadata associated with the media items;
   mapping, by the computing device, the parameters to the domain-specific metadata;
   identifying, by the computing device, a plurality of the media item segments with the domain-specific metadata that match at least a subset of the parameters, wherein the plurality of media item segments are segments extracted from disparate ones of the media items;
   selecting, by the computing device, a subset of the plurality of media item segments as the personalized content to be transmitted to the user based on respective importance scores, each of the respective importance scores is a rank of each media item segment relative to other segments and indicative of importance of content in each media item segment;
   obtaining, by the computing device, respective values of a level of interest variable different from the respective importance scores for each media item segment of the subset of media item segments, wherein the respective values of the level of interest variable are determined based on prior interactions of other users with each media item segment of the subset of media item segments and the respective values of the level of interest variable are indicative of a likely extent of the user's interest in each media item segment of the subset of media item segments;
   arranging, by the computing device based on the respective values of the level of interest variable, each media item segment of the subset of media item segments in the personalized content that are selected based on the respective importance scores; and
   transmitting, by the computing device, the personalized content comprising the arranged subset of the plurality of media item segments to the user.

2. The method of claim 1, wherein selecting the subset of media item segments further comprises,
   selecting, by the computing device for inclusion into the personalized content, the subset of the plurality of media item segments that comprise the respective values that are indicative of a high level of user interest.

3. The method of claim 1, further comprising:
   receiving, by the computing device, information associated with user interactions with the personalized content executed as the user consumes the personalized content; and
   updating, by the computing device, the respective values for the level of interest variable of the subset of media item segments based on the user interactions.

4. The method of claim 1, wherein criterion for arranging the subset of media item segments further comprises temporal data specifying a temporal sequence for ordering the subset of media items.

5. The method of claim 4, wherein the criterion for arranging the subset of media item segments comprises an ordered list of entities selected by the user.

6. The method of claim 1, wherein the parameters further comprise a number of media item segments to be included in the personalized content, a time period of each of the subset of media item segments, and a total time period of the personalized content.

7. The method of claim 1, further comprising:
   serving, by the computing device, a context sensitive advertisement along with the personalized content transmitted to the user.

8. The method of claim 1, wherein the plurality of media items feature highlights of a plurality of sporting events.

9. The method of claim 1, further comprising:
   removing, by the computing device, from the plurality of media items prior to the selection of the subset of media item segments, a media item that has a level of interest variable value indicative of low user interest.

10. A computing device comprising:
a processor;
a storage medium for tangibly storing thereon program logic for execution by the processor, the program logic comprising:
logic for enabling user access to media items from a plurality of domains, the media items having respective domain-specific metadata associated therewith;
receiving logic, executed by a processor, for receiving a request for personalized content for a user, the personalized content being generated from at least one of the domains;
obtaining logic, executed by the processor, for obtaining parameters associated with the request;
accessing logic, executed by the processor, for accessing a content index comprising the domain-specific metadata associated with media items;
mapping logic, executed by the processor, for mapping the parameters to the domain-specific metadata;
media item identifying logic, executed by the processor, for identifying a plurality of the media item segments with the domain-specific metadata that match at least a subset of the parameters, wherein the plurality of media item segments are segments extracted from disparate ones of the media items;
importance score selecting logic, executed by the processor, for selecting a subset of media item segments as the personalized content based on respective importance scores, each of the respective importance scores is a rank of each media item segment relative to other segments and indicative of importance of content in each media item segment;
obtaining logic, executed by the processor, for obtaining respective values of a level of interest variable different from the respective importance scores for each media item segment of the subset of media item segments, wherein the values of the level of interest variable are determined based on prior interactions of other users with each media item segment of the subset of media item segments and the respective values of the level of interest variable are indicative of a likely extent of the user's interest in each media item segment of the subset of media item segments;
arranging logic, executed by the processor, for arranging, based on the respective values of the level of interest variable, each media item segment of the subset of media item segments in the personalized content that are selected based on the respective importance scores; and
transmitting logic, executed by the processor, for transmitting the personalized content comprising the arranged subset of media item segments to the user.

11. The computing device of claim 10, further comprising, interesting items selecting logic, executed by the processor, for selecting the subset of the plurality of media item segments comprising the respective values that are indicative of a high level of user interest.

12. The computing device of claim 10, further comprising:
user interaction receiving logic, executed by the processor, for receiving information regarding user interactions with the personalized content executed as a user consumes the personalized content; and
updating logic, executed by the processor, for updating the respective values for the level of interest variable for the subset of media item segments based on the user interactions.

13. The computing device of claim 10, further comprising:
criteria identifying logic, executed by the processor, for identifying a criterion for arranging the subset of media item segments in the personalized content to be transmitted to the user.

14. The computing device of claim 13, wherein the criterion for arranging the subset of media item segments comprises temporal data specifying a temporal sequence for ordering the plurality of media items.

15. The computing device of claim 13, wherein the criterion for arranging the plurality of media item segments comprises an ordered list of entities.

16. The computing device of claim 10, wherein the parameters further comprise a number of media item segments to be included in the personalized content, a time period of each of the subset of media item segments, and a total time period of the personalized content.

17. A non-transitory computer readable storage medium, having stored thereon, processor-executable instructions for:
providing user access to media items from a plurality of domains, the media items having respective domain-specific metadata associated therewith;
receiving a request for personalized content for a user, the personalized content being generated from at least one of the domains;
obtaining parameters associated with the request;
accessing a content index comprising the respective domain-specific metadata associated with media items;
mapping the parameters to the domain-specific metadata;
identifying a plurality of the media item segments with metadata that match at least a subset of the parameters, wherein the plurality of media item segments are segments extracted from disparate ones of the media items;
selecting a subset of the plurality of media item segments as the personalized content to be transmitted to the user based on respective importance scores, each of the respective importance scores is a rank of each media item segment relative to other segments and indicative of importance of content in each media item segment;
obtaining respective values of a level of interest variable different from the respective importance scores for each media item segment of the subset of media item segments, wherein the values of the level of interest variable are determined based on prior interactions of other users with each media item segment of the subset of media item segments and the respective values of the level of interest variable are indicative of a likely extent of the user's interest in each media item segment of the subset of media item segments;
arranging, based on the respective values of the level of interest variable, each media item segment of the subset of media item segments in the personalized content that are selected based on the respective importance scores; and
transmitting the personalized content comprising the arranged subset of media item segments to the user.

18. The non-transitory computer readable storage medium of claim 17, wherein instructions for selecting the subset of media items further comprises instructions for:
selecting for inclusion into the personalized content, the subset of the plurality of media item segments that comprise the respective values that are indicative of a high level of user interest.

19. The non-transitory computer readable storage medium of claim 17, further comprising instructions for:

receiving information associated with user interactions with the personalized content executed as a user consumes the personalized content; and updating the respective values for the level of interest variable based on the user interactions.

20. A method for providing personalized content comprising:

displaying to a user, by a computing device on a display medium, a personalized user interface comprising information regarding a plurality of entities, the plurality of entities associated with media items from a plurality of domains, the media items having respective domain-specific metadata associated therewith;

receiving, by the computing device, a current user selection of one of the plurality of entities, the entity associated with at least one of the domains;

transmitting, by the computing device, the current user selection to a content provider;

receiving, by the computing device, from the content provider, personalized content associated with the current user selection, the personalized content comprises a subset of a plurality of media item segments extracted from the media items featuring the user selected entity, the subset of media item segments are selected based on respective importance scores, the respective importance scores is a rank of each media item segment relative to other segments and indicative of importance of content in each media item segment and the subset of media item segments that are selected based on the respective importance scores are arranged in the personalized content based on respective values of a level of interest variable different from the respective importance scores, the respective values of the level of interest variable are determined based on prior interactions of other users with each of the subset of media item segments and the respective values of the level of interest variable of the subset of media segments are indicative of high user interest;

displaying, by the computing device, the received personalized content to the user; and receiving, by the computing device, information regarding a user interaction with the personalized content during the display of the personalized content; and transmitting, by the computing device, the user interaction information to the content provider.

21. A computing device comprising:
a processor;
a storage medium for tangibly storing thereon program logic for execution by the processor, the program logic comprising:

interface display logic, executed by a processor for displaying to a user, on a display medium, a personalized user interface comprising information associated with a plurality of entities, the plurality of entities associated with media items from a plurality of domains, the media items having respective domain-specific metadata associated therewith;

current selection receiving logic, executed by the processor, for receiving a current user selection of one of the plurality of entities;

current selection transmitting logic, executed by the processor, for transmitting the current user selection to a content provider;

receiving logic, executed by the processor, for receiving from the personalized content provider, personalized content associated with the current user selection, the personalized content comprises a subset of a plurality of media segments extracted from the media items featuring the user selected entity, the subset of media item segments are selected based on respective importance scores, the respective importance scores is a rank of each media item segment relative to other segments and indicative of importance of content in each media segment and the subset of media item segments that are selected based on the respective importance scores are arranged in the personalized content based on respective values of a level of interest variable different from the respective importance scores, the respective values of the level of interest variable are determined based on prior interactions of other users with each of the subset of media item segments and the respective values of the level of interest variable of the subset of media segments are indicative of high user interest;

personalized content display logic, executed by the processor, for displaying the received personalized content to the user; and user interaction receiving logic, executed by the processor, for receiving information regarding a user interaction with the personalized content during the display of the personalized content; and user interaction transmitting logic, executed by the processor, for transmitting the user interaction information to the content provider.

* * * * *